(12) United States Patent
Chae

(10) Patent No.: US 10,244,482 B2
(45) Date of Patent: Mar. 26, 2019

(54) METHOD FOR TRANSMITTING OR RECEIVING V2X SIGNAL IN WIRELESS COMMUNICATION SYSTEM AND DEVICE FOR PERFORMING SAME

(71) Applicant: LG ELECTRONICS INC., Seoul (KR)

(72) Inventor: Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/748,134

(22) PCT Filed: Aug. 22, 2016

(86) PCT No.: PCT/KR2016/009236
§ 371 (c)(1),
(2) Date: Jan. 26, 2018

(87) PCT Pub. No.: WO2017/034258
PCT Pub. Date: Mar. 2, 2017

(65) Prior Publication Data
US 2018/0359707 A1    Dec. 13, 2018

Related U.S. Application Data

(60) Provisional application No. 62/207,933, filed on Aug. 21, 2015.

(51) Int. Cl.
*H04W 52/10* (2009.01)
*H04B 17/10* (2015.01)
(Continued)

(52) U.S. Cl.
CPC .......... *H04W 52/10* (2013.01); *H04B 17/103* (2015.01); *H04W 4/40* (2018.02); *H04W 52/242* (2013.01); *H04W 72/0473* (2013.01)

(58) Field of Classification Search
CPC ..... H04W 52/10; H04W 4/40; H04W 52/242; H04W 72/0473; H04B 17/103
(Continued)

(56) References Cited

U.S. PATENT DOCUMENTS 8,358,619 B2 *  1/2013  Cho ............... H04L 5/0007
                                                370/329
8,565,210 B2 * 10/2013  Cho ............... H04W 52/04
                                                370/343
(Continued)

FOREIGN PATENT DOCUMENTS

KR    1020110027203    3/2011
KR    1020120121299    11/2012
(Continued)

OTHER PUBLICATIONS

PCT International Application No. PCT/KR2016/009236, Written Opinion of the International Searching Authority dated Nov. 21, 2016, 20 pages.
(Continued)

*Primary Examiner* — Hai V Nguyen
(74) *Attorney, Agent, or Firm* — Lee, Hong, Degerman, Kang & Waimey PC

(57) ABSTRACT

A method by which a terminal transmits a signal in a wireless communication system supporting vehicle to everything (V2X), according to one embodiment of the present invention, comprises the steps of: measuring a path loss for a stationary node; and transmitting a V2X signal on the basis of a V2X transmission period or an event trigger, wherein, when the V2X signal is transmitted in a periodically set open loop power control (OLPC) resource region, transmission power of the V2X signal is determined on the basis of the
(Continued)

measured path loss, and a period of the OLPC resource region can be set to be independent from the V2X transmission period.

15 Claims, 15 Drawing Sheets

(51) Int. Cl.
   *H04W 4/40* (2018.01)
   *H04W 52/24* (2009.01)
   *H04W 72/04* (2009.01)
(58) Field of Classification Search
   USPC .......................................................... 455/522
   See application file for complete search history.

(56) References Cited

U.S. PATENT DOCUMENTS

| | | | | |
|---|---|---|---|---|
| 9,030,984 | B2* | 5/2015 | Yang | H04W 52/242 |
| | | | | 370/311 |
| 9,794,051 | B2* | 10/2017 | Feng | H04W 52/146 |
| 10,009,900 | B2* | 6/2018 | Lindoff | H04W 72/1257 |
| 10,098,129 | B2* | 10/2018 | Lindoff | H04W 52/383 |
| 2008/0220806 | A1* | 9/2008 | Shin | H04W 52/08 |
| | | | | 455/522 |
| 2011/0103241 | A1* | 5/2011 | Cho | H04L 5/0007 |
| | | | | 370/252 |
| 2011/0194423 | A1* | 8/2011 | Cho | H04W 52/04 |
| | | | | 370/252 |
| 2013/0163532 | A1* | 6/2013 | Anderson | H04W 72/04 |
| | | | | 370/329 |
| 2013/0163533 | A1* | 6/2013 | Anderson | H04W 72/04 |
| | | | | 370/329 |
| 2013/0163534 | A1* | 6/2013 | Anderson | H04L 1/0026 |
| | | | | 370/329 |
| 2013/0163535 | A1* | 6/2013 | Anderson | H04W 72/04 |
| | | | | 370/329 |
| 2013/0163536 | A1* | 6/2013 | Anderson | H04W 72/1284 |
| | | | | 370/329 |
| 2013/0163537 | A1* | 6/2013 | Anderson | H04W 72/1284 |
| | | | | 370/329 |
| 2014/0198694 | A1* | 7/2014 | Yang | H04W 52/242 |
| | | | | 370/311 |
| 2015/0256320 | A1* | 9/2015 | Feng | H04W 52/146 |
| | | | | 370/280 |
| 2015/0334715 | A1* | 11/2015 | Chang | H04W 4/70 |
| | | | | 370/329 |
| 2016/0135143 | A1* | 5/2016 | Won | H04W 72/005 |
| | | | | 370/312 |
| 2016/0204885 | A1* | 7/2016 | Sorrentino | H04W 72/04 |
| | | | | 455/67.11 |
| 2016/0205525 | A1* | 7/2016 | Baghel | H04W 52/38 |
| | | | | 370/329 |
| 2016/0219566 | A1* | 7/2016 | Jung | H04W 76/14 |
| 2016/0249297 | A1* | 8/2016 | Oh | H04W 76/14 |
| 2016/0295595 | A1* | 10/2016 | Chae | H04W 72/00 |
| 2017/0245282 | A1* | 8/2017 | Lee | H04W 52/24 |
| 2017/0303291 | A1* | 10/2017 | Chae | H04W 72/04 |
| 2017/0367059 | A1* | 12/2017 | Park | H04W 36/30 |
| 2018/0013539 | A1* | 1/2018 | Feng | H04W 52/146 |
| 2018/0139706 | A1* | 5/2018 | Li | H04W 52/383 |
| 2018/0139794 | A1* | 5/2018 | Chae | H04W 40/12 |
| 2018/0152272 | A1* | 5/2018 | Chae | H04W 48/08 |

FOREIGN PATENT DOCUMENTS

| | | |
|---|---|---|
| KR | 1020150041497 | 4/2015 |
| WO | 2015115870 | 8/2015 |

OTHER PUBLICATIONS

Yuri Victor Lima De Melo, "Power Control and Energy Efficiency Strategies for D2D Communications Underlying Cellular Networks", Jul. 2015, 74 pages.

* cited by examiner (a) CONTROL-PLANE PROTOCOL STACK (b) USER-PLANE PROTOCOL STACK (a) in coverage    (b) out-of-coverage    (c) partial coverage

METHOD FOR TRANSMITTING OR RECEIVING V2X SIGNAL IN WIRELESS COMMUNICATION SYSTEM AND DEVICE FOR PERFORMING SAME

CROSS-REFERENCE TO RELATED APPLICATIONS

This application is the National Stage filing under 35 U.S.C. 371 of International Application No. PCT/KR2016/009236, filed on Aug. 22, 2016, which claims the benefit of U.S. Provisional Application No. 62/207,933, filed on Aug. 21, 2015, the contents of which are all hereby incorporated by reference herein in their entirety.

TECHNICAL FIELD

The present invention relates to a wireless communication system, and more particularly, to a method of transmitting or receiving a V2X signal via open-loop power control in a wireless communication system supporting V2X and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

A technical task of the present invention is to provide a method for making a fixed node efficiently and precisely receive a V2X signal transmitted by a UE by selectively applying open-loop power control according to a resource region to which the V2X signal transmitted by the UE is mapped in a wireless communication system supporting V2X and an apparatus therefor.

Technical Solution

To achieve these and other advantages and in accordance with the purpose of the present invention, as embodied and broadly described, according to one embodiment, a method of transmitting a signal by a user equipment (UE) in a wireless communication system supporting vehicle to everything (V2X), includes measuring a pathloss for a fixed node and transmitting a V2X signal based on a V2X transmission periodicity or an event trigger. In this case, if transmission of the V2X signal is performed in a open loop power control (OLPC) resource region that is configured periodically, transmit power of the V2X signal is determined based on the measured pathloss and a periodicity of the OLPC resource region can be configured independently of the V2X transmission periodicity.

To further achieve these and other advantages and in accordance with the purpose of the present invention, according to a different embodiment, a user equipment in a wireless communication system supporting vehicle to everything (V2X) includes a processor to measure a pathloss for a fixed node and a transmitter d to transmit a V2X signal based on a V2X transmission periodicity or an event trigger. In this case, if transmission of the V2X signal is performed in an open loop power control (OLPC) resource region that is configured periodically, transmit power of the V2X signal is determined based on the measured pathloss and a periodicity of the OLPC resource region can be configured independently of the V2X transmission periodicity.

To further achieve these and other advantages and in accordance with the purpose of the present invention, according to a further different embodiment, a method of receiving a signal by a fixed node in a wireless communication system supporting vehicle to everything (V2X), includes transmitting a reference signal for measuring a pathloss to a user equipment (UE), and receiving, through an open loop power control (OLPC) resource region that is configured periodically, a V2X signal transmitted based on a V2X transmission periodicity or an event trigger. In this case, transmit power of the V2X signal is determined based on the measurement of the pathloss and a periodicity of the OLPC resource region can be configured independently of the V2X transmission periodicity.

Preferably, the periodicity of the OLPC resource region can be configured as a value relative prime with the V2X transmission periodicity.

Preferably, if the transmission of the V2X signal is performed based on the event trigger, the UE can be configured to transmit the V2X signal at least one time in the OLPC resource region.

Preferably, the periodically configured OLPC resource region can include a first region where the fixed node overhears the V2X signal.

Preferably, the periodically configured OLPC resource region includes a second region where the fixed node performs transmission and the fixed node can transmit the overheard V2X signal to a different fixed node in the second region.

Preferably, if the transmission of the V2X signal is performed in a different resource region, the transmit power of the V2X signal can be fixed to a prescribed value irrespective of the measured pathloss.

Preferably, the fixed node may correspond to a fixed node having highest reception power among fixed nodes adjacent to the UE.

Advantageous Effects

According to one embodiment of the present invention, when a resource region to which a V2X signal transmitted by a UE is mapped corresponds to an OLPC resource region in a wireless communication system supporting V2X, if open-loop power control is applied on the basis of a fixed node, since interference experienced by the fixed node due to in-band emission is reduced and an OLPC resource region for the fixed node is partly configured, it is able to prevent reception performance deterioration of other moving nodes that perform V2V communication.

Effects obtainable from the present invention are non-limited by the above mentioned effect. And, other unmentioned effects can be clearly understood from the following description by those having ordinary skill in the technical field to which the present invention pertains.

MODE FOR INVENTION

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications. In the present disclosure, a base station (eNB) may be used as a broad meaning including a remote radio head (RRH), an eNB, a transmission point (TP), a reception point (RP), a relay, etc.

Figure 1:
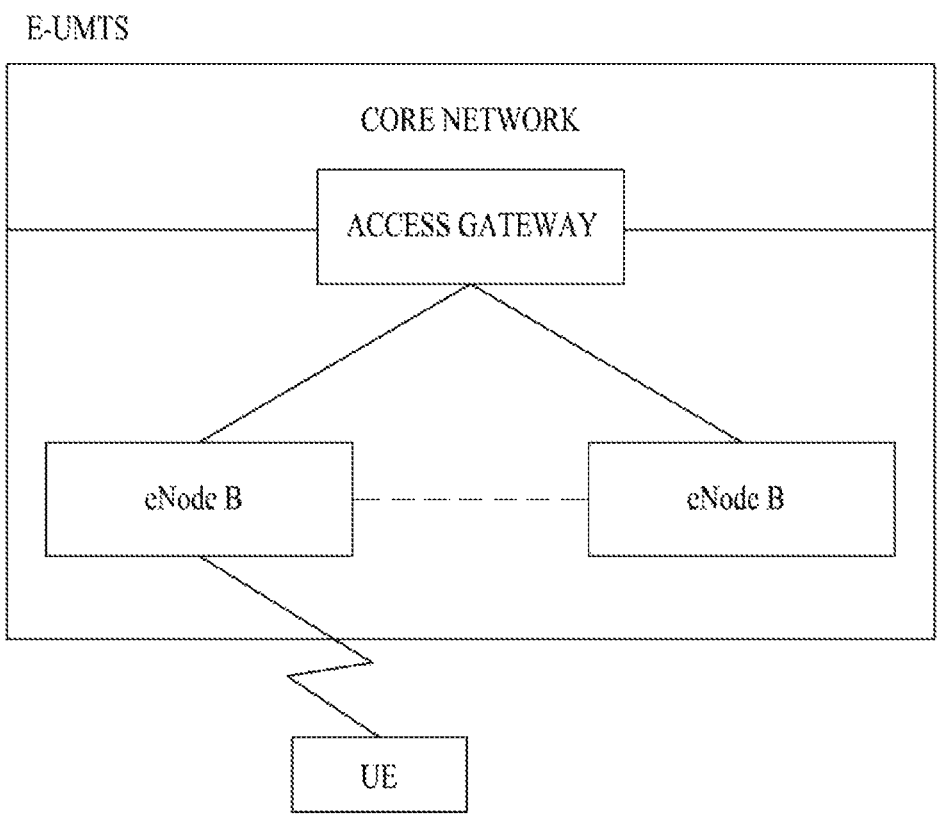
FIG. 1 is a diagram schematically illustrating a network structure of an E-UMTS as an exemplary radio communication system.
Figure 2:
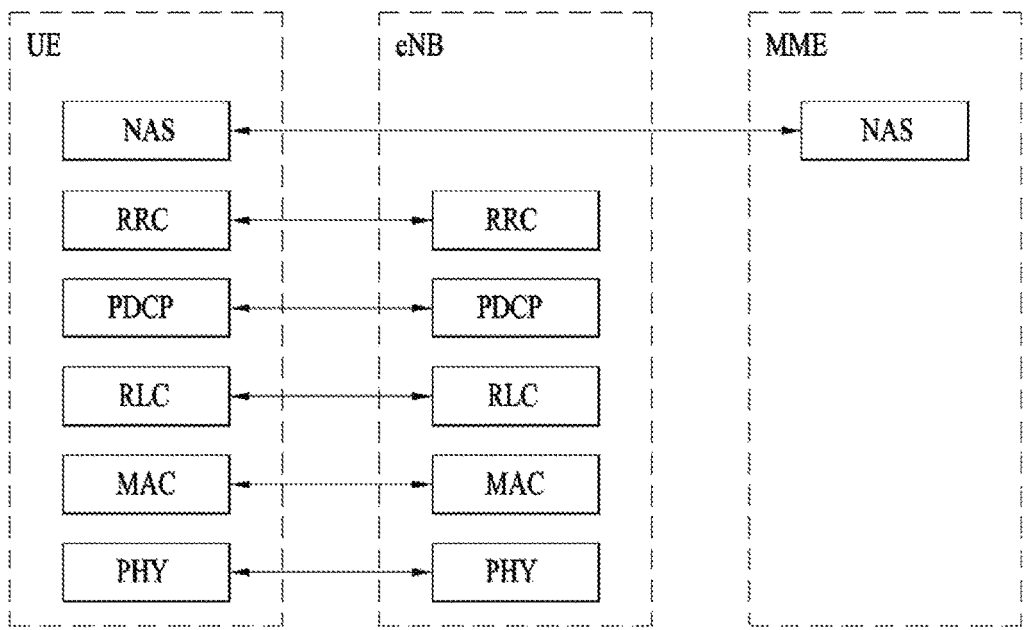
FIG. 2 is a diagram illustrating structures of a control plane and a user plane of a radio interface protocol between a UE and an E-UTRAN based on the 3GPP radio access network specification.
Figure 2:
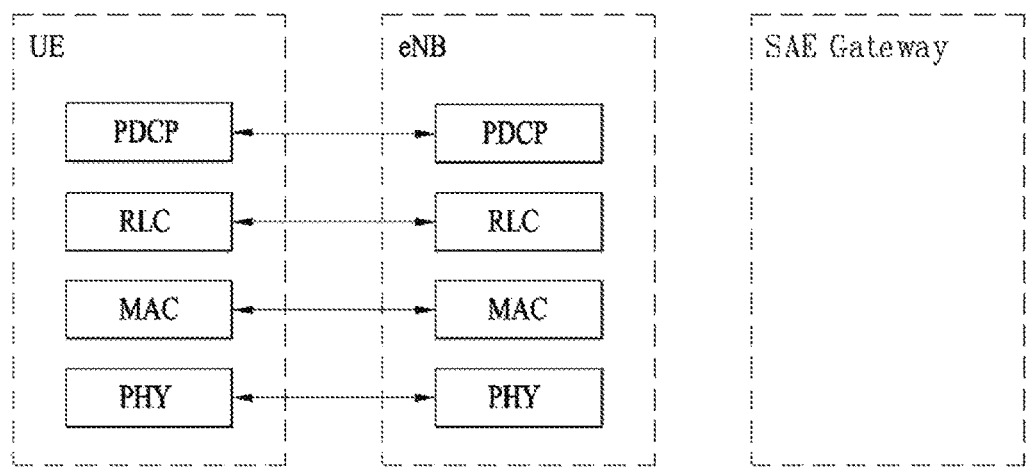

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constituting an eNB is set to one of the bandwidths of 1.44, 3, 5, 10, 15 and 20 Mhz and provides DL or UL transmission service to a plurality of UEs in the bandwidth. Different cells may be configured so as to provide different bandwidths DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
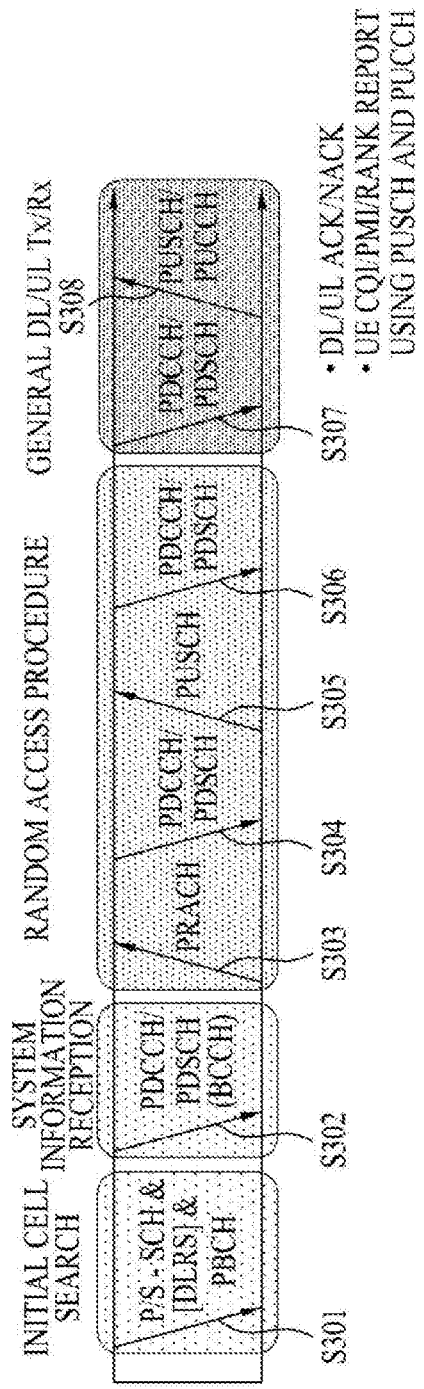
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
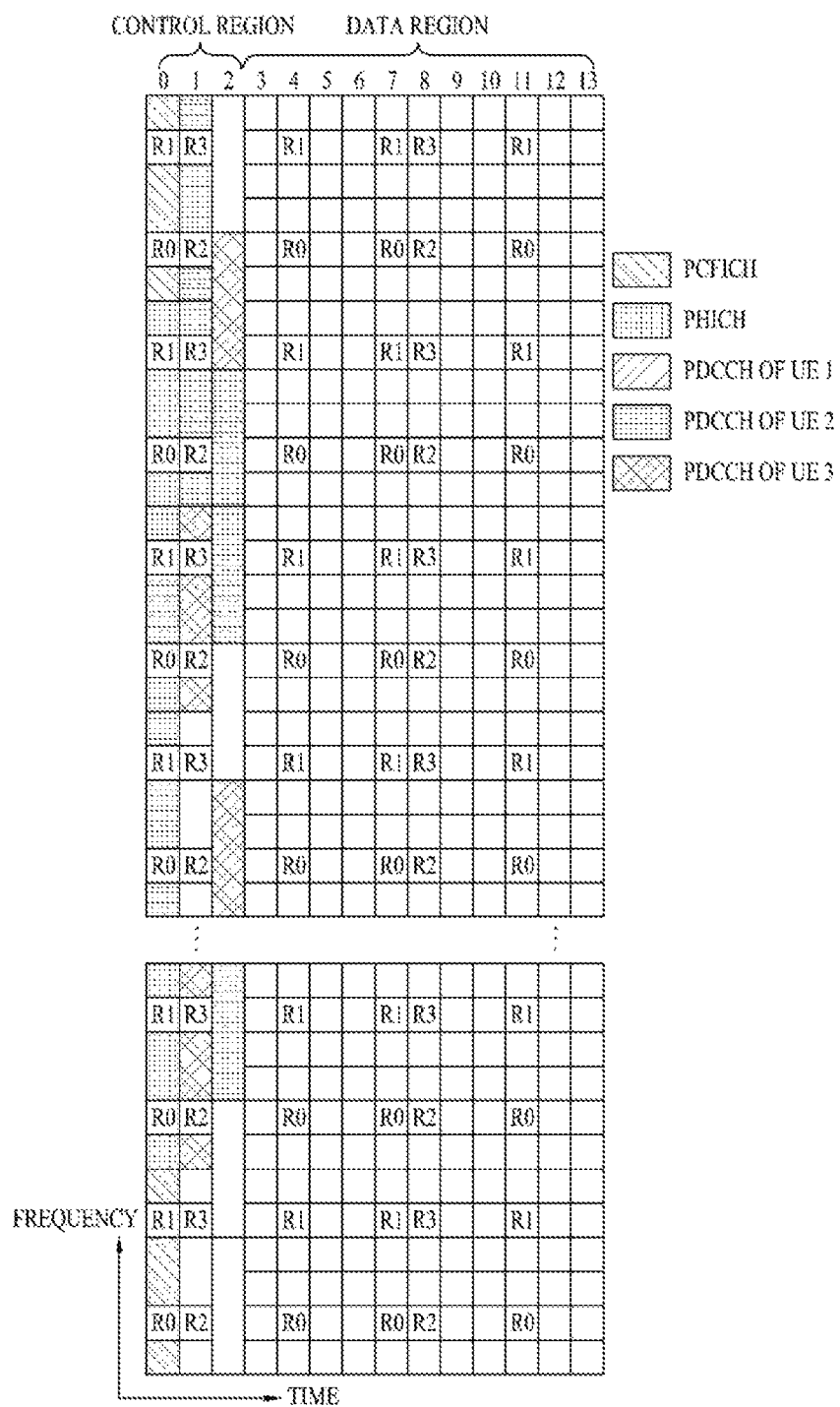
FIG. 4 is a diagram illustrating the structure of a DL radio frame used in an LTE system.

FIG. 4 is a diagram illustrating control channels contained in a control region of one subframe in a DL radio frame.

Referring to FIG. 4, one subframe includes 14 OFDM symbols. The first to third ones of the 14 OFDM symbols may be used as a control region and the remaining 11 to 13 OFDM symbols may be used as a data region, according to subframe configuration. In FIG. 4, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 5:
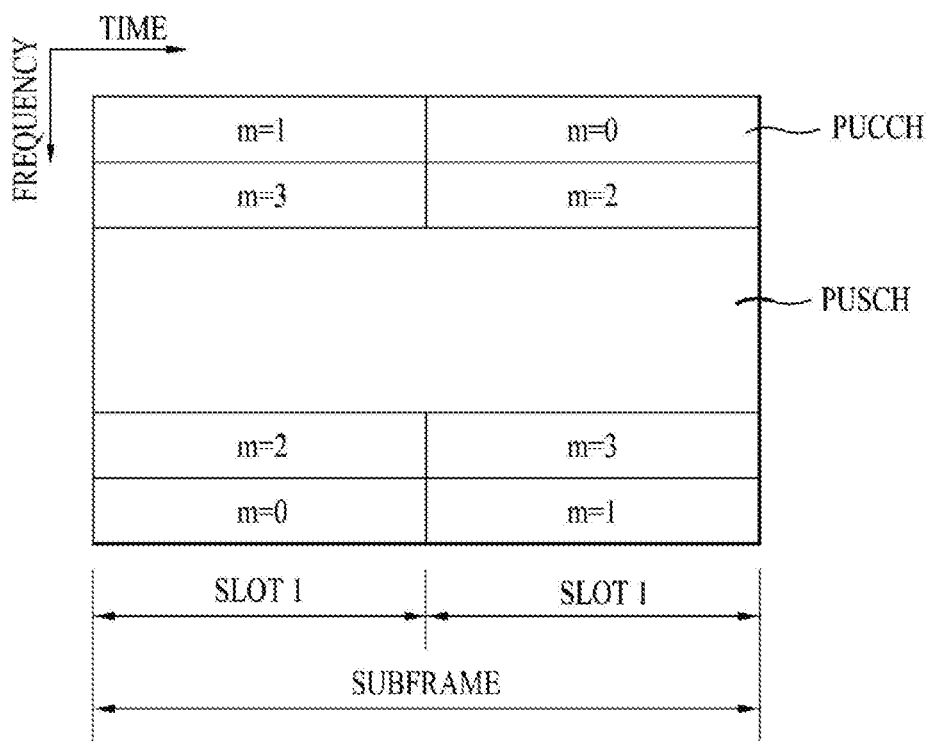
FIG. 5 is a diagram illustrating the structure of a UL subframe in an LTE system.

FIG. 5 is a diagram illustrating the structure of a UL subframe in an LTE system.

Referring to FIG. 5, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 5.

And, time capable of transmitting a sounding reference signal in a subframe corresponds to a symbol period lastly positioned in a subframe in a time axis and the sounding reference signal is transmitted through a data transmission band in frequency axis. Sounding reference signals of a plurality of UEs transmitted through a last symbol of an identical subframe can be distinguished from each other according to a frequency position.

Figure 6:
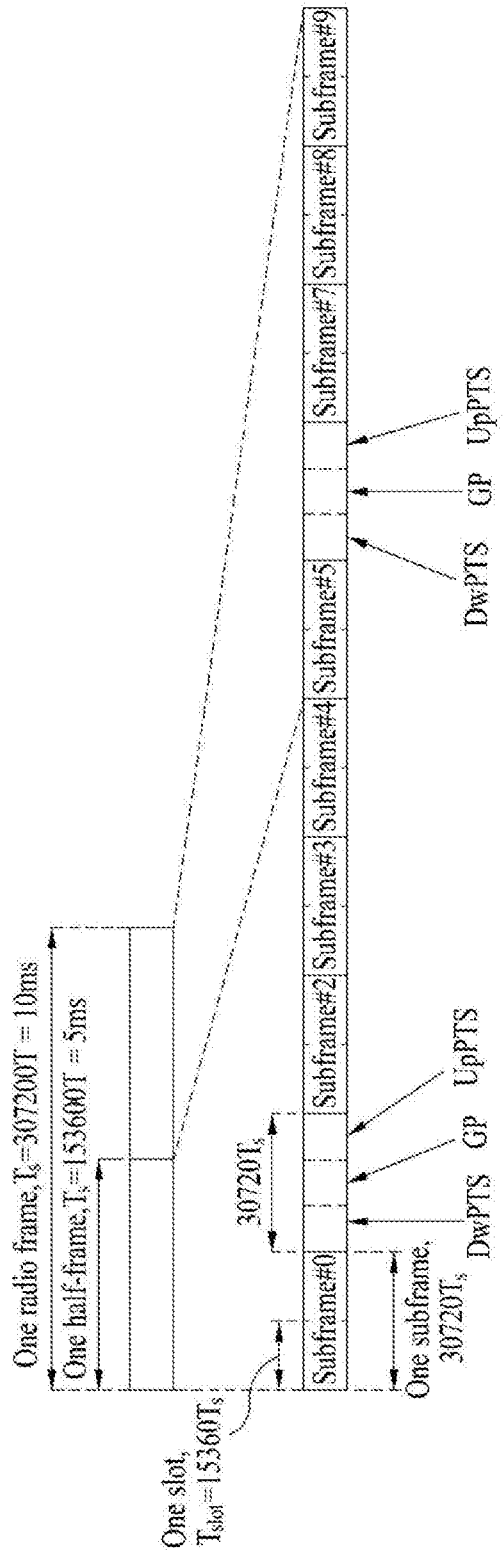
FIG. 6 illustrates a structure of a radio frame in an LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 1 below.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D, U, and S refer to a downlink subframe, an uplink subframe, and the special subframe. In addition, Table 1 also shows downlink-to-uplink switch-point periodicity in an uplink/downlink subframe configuration in each system.

Figure 7:
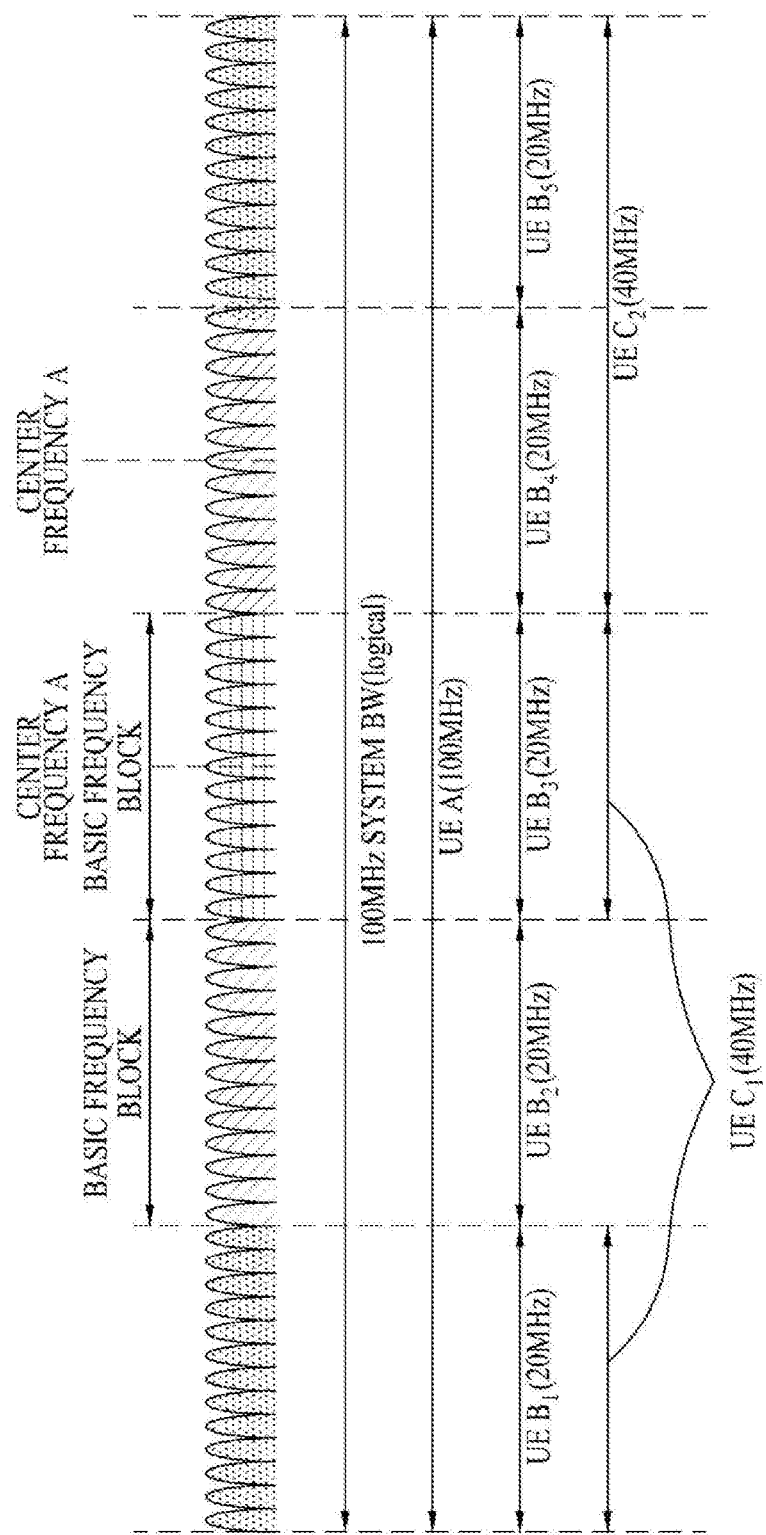
FIG. 7 is a view illustrating concept of a carrier aggregation scheme.

Hereinafter, a carrier aggregation scheme will be described. FIG. 7 is a view illustrating concept of a carrier aggregation scheme.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' will consistently used.

Figure 8:
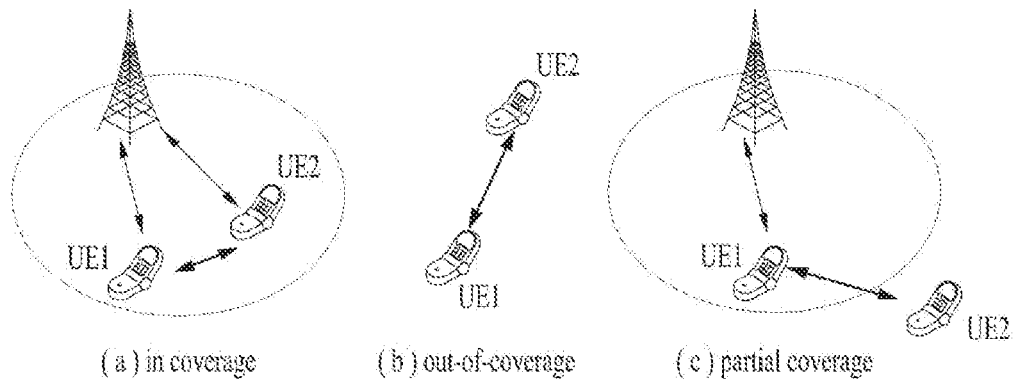
FIG. 8 is a diagram illustrating exemplary scenarios of D2D communication.

Referring to FIG. 7, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 7 illustrates the case in which component carriers have the same bandwidth, the case is purely exemplary, and thus, the component carriers may have different bandwidths. In addition, although FIG. 7 illustrates the case in which the component carriers are adjacent to each other in the frequency domain, FIG. 8 are logically illustrated, and thus, the component carriers may be physically adjacent to each other or may be spaced apart from each other.

Component carriers can use different center frequencies or use one common center frequency with respect to physically adjacent component carriers. For example, in FIG. 8, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers as illustrated in FIG. 7. In this case, a method for scheduling a data channel by a control channel may be classified into a linked carrier scheduling method and a cross carrier scheduling method.

In more detail, in the linked carrier scheduling method, a control channel transmitted through a specific component carrier schedules only a data channel through the specific component carrier like in a legacy LTE system using a single component carrier.

Meanwhile, in the cross carrier scheduling method, a control channel transmitted through a primary component carrier (primary CC) using a carrier indicator field (CIF) schedules a data channel transmitted through a data channel transmitted through the primary CC or a secondary CC.

A description will be given of a method for controlling uplink transmission power in an LTE system.

A method for controlling, by a UE, uplink transmission power thereof includes open loop power control (OLPC) and closed loop power control (CLPC). The former controls power in such a manner that attenuation of a downlink signal from a base station of a cell to which a UE belongs is estimated and compensated for. OLPC controls uplink power by increasing uplink transmission power when downlink signal attenuation increases as a distance between the UE and the base station increases. The latter controls uplink power in such a manner that the base station directly transmits information (i.e. a control signal) necessary to control uplink transmission power.

The following equation 1 is used to determine transmission power of a UE when a serving cell c transmits only a PUSCH instead of simultaneously transmitting the PUSCH and a PUCCH in a subframe corresponding to a subframe index i in a system that supports carrier aggregation.

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} [dBm]$$ [Equation 1]

The following equation 2 is used to determine PUSCH transmission power when the serving cell c simultaneously transmits the PUCCH and the PUSCH in the subframe corresponding to the subframe index i in a system supporting carrier aggregation.

$$P_{PUSCH,c}(i) = \min \left\{ \begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} [dBm]$$ [Equation 2]

Parameters, which will be described in association with Equations 1 and 2, determine uplink transmission power of a UE in the serving cell c. Here, $P_{CMAX,c}(i)$ in Equation 1 indicates maximum transmittable power of the UE in the subframe corresponding to the subframe index i and $\hat{P}_{CMAX,c}(i)$ in Equation 2 indicates a linear value of $P_{CMAX,c}(i)$. $\hat{P}_{PUCCH}(i)$ in Equation 2 indicates a linear value of $P_{PUCCH}(i)$ ($P_{PUCCH}(i)$ indicating PUCCH transmission power in the subframe corresponding to subframe index i).

In Equation 1, $M_{PUSCH,c}(i)$ is a parameter indicating a PUSCH resource allocation bandwidth, which is represented as the number of resource blocks valid for the subframe index i, and is allocated by a base station. $P_{O\_PUSCH,c}(j)$ is a parameter corresponding to the sum of a cell-specific nominal component $P_{O\_NOMINAL\_PUSCH,c}(j)$ provided by a higher layer and a UE-specific component $P_{O\_UE\_PUSCH,c}(j)$ provided by the higher layer and is signaled to the UE by the base station.

j is 1 in PUSCH transmission/retransmission according to an uplink grant and j is 2 in PUSCH transmission/retransmission according to a random access response. In addition, $P_{O\_UE\_PUSCH,c}(2)=0$ and $P_{O\_NOMINAL\_PUSCH,c}(2)=P_{O\_PRE}+\Delta_{PREAMBLE\_Msg3}$. Parameters $P_{O\_PRE}$ and $\Delta_{PREAMBLE\_Msg3}$ are signaled by the higher layer.

$\alpha_c(j)$ is a pathloss compensation factor and a cell-specific parameter provided by the higher layer and transmitted as 3 bits by the base station. $\alpha \in \{0, 0.4, 0.5, 0.6, 0.7, 0.8, 0.9, 1\}$ when j is 0 or 1 and $\alpha_c(j)=1$ when j is 2. $\alpha_c(j)$ is a value signaled to the UE by the base station.

Pathloss $PL_c$ is a downlink pathloss (or signal loss) estimate value in dBs, calculated by the UE, and is represented as $PL_c$=referenceSignalPower−higher layer filtere-dRSRP. Here, referenceSignalPower can be signaled to the UE by the base station via the higher layer.

$f_c(i)$ is a value indicating current PUSCH power control adjustment state for the subframe index i and can be represented as a current absolute value or accumulated value. When accumulation is enabled on the basis of a parameter provided by the higher layer or a TPC command $\delta_{PUSCH,c}$ is included in a PDCCH along with DCI format 0 for the serving cell c in which CRC is scrambled with temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled through the PDCCH with DCI format 0/4 or 3/3A in a subframe $i-K_{PUSCH}$. Here, $f_c(0)$ is the first value after reset of the accumulated value.

$K_{PUSCH}$ is defined in LTE as follows.

For FDD (Frequency Division Duplex), $K_{PUSCH}$ has a value of 4. As to TDD, $K_{PUSCH}$ has values as shown in Table 2.

TABLE 2

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |

TABLE 2-continued

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The UE attempts to decode a PDCCH in DCI format 0/4 with C-RNTI thereof or to decode a PDCCH in DCI format 3/3A and a DCI format for SPS C-RNTI with TPC-PUSCH-RNTI thereof in each subframe in cases other than DRX state. When DCI formats 0/4 and 3/3A for the serving cell c are detected in the same subframe, the UE needs to use $\delta_{PUSCH,c}$ provided in DCI format 0/4. When a TPC command decoded for the serving cell c is not present, DRX is generated or a subframe having index i is a subframe other than an uplink subframe in TDD, $\delta_{PUSCH,c}$ is 0 dB.

Accumulated $\delta_{PUSCH,c}$ which is signaled together with DCI format 0/4 on a PDCCH, is shown in Table 3. When a PDCCH with DCI format 0 is validated through SPS activation or released, $\delta_{PUSCH,c}$ is 0 dB. Accumulated $\delta_{PUSCH,c}$ which is signaled with DCI format 3/3A on a PDCCH, is one of SET1 of Table 3 or one of SET2 of Table 4, determined by a TPC-index parameter provided by the higher layer.

TABLE 3

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 4

| TPC Command Field in DCI format 3A | Accumulated $\delta_{PUSCH,c}$ [dB] |
|---|---|
| 0 | −1 |
| 1 | 1 |

When the UE reaches maximum transmission power $\hat{P}_{CMAX}(i)$ in the serving cell c, a positive TPC command is not accumulated for the serving cell c. Conversely, when the UE reaches minimum transmission power, a negative TPC command is not accumulated.

The following equation 3 is related to uplink power control with respect to a PUCCH in LTE.

$$P_{PUCCH}(i) = \min\left\{\begin{array}{l}P_{CMAX,c}(i),\\ P_{0\_PUCCH} + PL_c + h(n_{CQI}, n_{HARQ}, n_{SR}) + \\ \Delta_{F\_PUCCH}(F) + \Delta_{TxD}(F') + g(i)\end{array}\right\}[dBm] \quad \text{[Equation 3]}$$

In Equation 3, i indicates a subframe index and c indicates a cell index. When a UE is configured by a higher layer to transmit a PUCCH over through antenna ports, $\Delta_{TxD}(F')$ is provided to the UE by the higher layer. In other cases, $\Delta_{TxD}(F')$ is 0. Parameters with respect to a cell having the cell index c will now be described.

$P_{CMAX,c}(i)$ indicates maximum transmission power of a UE, $P_{0\_PUCCH}$ is a parameter corresponding to the sum of cell-specific parameters and signaled by a base station through higher layer signaling, $PL_c$ is a downlink pathloss (or signal loss) estimate value calculated in dBs by the UE and is represented as $PL_c$=referenceSignalPower−higher layer filteredRSRP. h(n) is a value depending on PUCCH format, $n_{CQI}$ is the number of information bits with respect to channel quality information (CQI) and $n_{HARQ}$ indicates the number of HARQ bits. In addition $\Delta_{F\_PUCCH}(F)$ is a relative value with respect to PUCCH format 1a and a value corresponding to PUCCH format #F, which is signaled by the base station through higher layer signaling. g(i) indicates a current PUCCH power control adjustment state of a subframe having index i.

g(0)=0 when $P_{O\_UE\_PUCCH}$ is changed in the higher layer and g(0)=$\Delta P_{rampup}+\delta_{msg\ 2}$ otherwise. $\delta_{msg\ 2}$ is a TPC command indicated in a random access response $\Delta P_{rampup}$ corresponds to total power ramp-up from the first to last preambles, provided by the higher layer.

When a UE reaches maximum transmission power $P_{CMAX,c}(i)$ in a primary cell, a positive TPC command is not accumulated for the primary cell. When the UE reaches minimum transmission power, a negative TPC command is not accumulated. The UE resets accumulation when $P_{O\_UE\_PUCCH}$ is changed by the higher layer or upon reception of a random access response.

Tables 5 and 6 show $\delta_{PUCCH}$ indicated by a TPC command in DCI formats. Particularly, Table 5 shows $\delta_{PUCCH}$ indicated in DCI formats other than DCI format 3A and Table 6 shows $\delta_{PUCCH}$ indicated in DCI format 3A.

TABLE 5

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 6

| TPC Command Field in DCI format 3A | $\delta_{PUCCH}$ [dB] |
|---|---|
| 0 | −1 |
| 1 | 1 |

Equation 4 in the following corresponds to an equation related to power control of a sounding reference signal (SRS) in LTE system.

$$P_{SRS,c}(i) = \min\left\{\begin{array}{l}P_{CMAX,c}(i)\\ P_{SRS\_OFFSET,c}(m) + 10\log_{10}(M_{SRS,c}) + \\ P_{O\_PUSCH,c}(j) + \alpha_c(j) \cdot PL_c + f_c(i)\end{array}\right\}[dBm] \quad \text{[Equation 4]}$$

In Equation 4, i corresponds to a subframe index and c corresponds to a cell index. In this case, $P_{CMAX,c}(i)$ corresponds to maximum power capable of being transmitted by a UE and $P_{SRS\_OFFSET,c}(m)$ corresponds to a value configured by an upper layer. If m is 0, it may correspond to a case of transmitting a periodic sounding reference signal. If m is not 0, it may correspond to a case of transmitting an aperiodic sounding reference signal. $M_{SRS,c}$ corresponds to a sounding reference signal bandwidth on a subframe index i of a serving cell c and is represented by the number of resource blocks.

$f_c(i)$ corresponds to a value indicating a current PUSCH power control adjustment status for a subframe index i of a serving cell c. $P_{O\_PUSCH,c}(j)$ and $\alpha_c(j)$ are also identical to what is mentioned earlier in Equation 1 and 2.

Hereinafter, a Sounding Reference Signal (SRS) will be described.

The SRS is composed of constant amplitude zero auto correlation (CAZAC) sequences. SRSs transmitted from several UEs are CAZAC sequences $r^{SRS}(n)=r_{u,v}^{(\alpha)}(n)$ having different cyclic shift values $\alpha$ according to Equation 1.

$$\alpha = 2\pi \frac{n_{SRS}^{cs}}{8} \quad \text{[Equation 1]}$$

where, $n_{SRS}^{cs}$ is a value set to each UE by a higher layer and has an integer value of 0 to 7. Accordingly, the cyclic shift value may have eight values according to $n_{SRS}^{cs}$.

CAZAC sequences generated from one CAZAC sequence through cyclic shift have zero correlation values with sequences having different cyclic shift values. Using such property, SRSs of the same frequency domain may be divided according to CAZAC sequence cyclic shift values. The SRS of each UE is allocated onto the frequency axis according to a parameter set by the eNB. The UE performs frequency hopping of the SRS so as to transmit the SRS with an overall uplink data transmission bandwidth.

Hereinafter, a detailed method of mapping physical resources for transmitting SRSs in an LTE system will be described.

In order to satisfy transmit power $P_{SRS}$ of a UE, an SRS sequence $r^{SRS}(n)$ is first multiplied by an amplitude scaling factor $\beta_{SRS}$ and is then mapped to a resource element (RE) having an index (k, l) from $r^{SRS}(0)$ by Equation 6.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \quad \text{[Equation 6]}$$

where, $k_0$ denotes a frequency domain start point of an SRS and is defined by Equation 7.

$$k_0 = k'_0 + \sum_{b=0}^{B_{SRS}} 2M_{sc,b}^{RS} n_b \quad \text{[Equation 7]}$$

where, $n_b$ denotes a frequency location index. $k'_0$ for a general uplink subframe is defined by Equation 8 and $k'_0$ for an uplink pilot time is defined by Equation 9.

$$k'_0 = (\lfloor N_{RB}^{UL}/2 \rfloor - m_{SRS,0}/2)N_{SC}^{RB} + k_{TC} \quad \text{[Equation 8]}$$

$$k'_0 = \quad \text{[Equation 9]}$$
$$\begin{cases} (N_{RB}^{UL} - m_{SRS,0}^{max})N_{sc}^{RB} + k_{TC} & \text{if } \left(\begin{array}{c}(n_f \bmod 2) \times \\ (2 - N_{SP}) + n_{hf}\end{array}\right) \bmod 2 = 0 \\ k_{TC} & \text{otherwise} \end{cases}$$

In Equations 4 and 5, $k_{TC}$ denotes a transmissionComb parameter signaled to a UE via a higher layer and has a value of 0 or 1. In addition, $n_{hf}$ is 0 in an uplink pilot time slot of a first half frame and is 0 an uplink pilot slot of a second half frame. $M_{sc,b}^{RS}$ is the length, that is, the bandwidth, if the SRS sequence expressed in subcarrier units defined by Equation 10.

$$M_{sc,b}^{RS} = m_{SRS,b} N_{sc}^{RB}/2 \quad \text{[Equation 10]}$$

In Equation 10, $m_{SRS,b}$ is a value signaled from an eNB according to an uplink bandwidth $N_{RB}^{UL}$.

The UE may perform frequency hopping of the SRS so as to transmit the SRS with the overall uplink data transmission bandwidth. Such frequency hopping is set by a parameter $b_{hop}$ having a value of 0 to 3 received from a higher layer.

If frequency hopping of the SRS is inactivated, that is, if $b_{hop} \geq B_{SRS}$, a frequency location index $n_b$ has a constant value as shown in Equation 11. Here, $n_{RRC}$ is a parameter received from a higher layer.

$$n_b = \lfloor 4n_{RRC}/m_{SRS,b} \rfloor \bmod N_b \quad \text{[Equation 11]}$$

Meanwhile, if frequency hopping of the SRS is activated, that is, $b_{hop} \leq B_{SRS}$, a frequency location index $n_b$ is defined by Equations 12 and 13.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{[Equation 12]}$$

$$F_b(n_{SRS}) = \begin{cases} (N_b/2)\left\lfloor \dfrac{n_{SRS} \bmod \prod_{b'=b_{hop}}^{b} N'_b}{\prod_{b'=b_{hop}}^{b-1} N'_b} \right\rfloor + \\ \quad \left\lfloor \dfrac{n_{SRS} \bmod \prod_{b'=b_{hop}}^{b} N'_b}{2\prod_{b'=b_{hop}}^{b-1} N'_b} \right\rfloor & \text{if } N_b \text{ even} \\ \lfloor N_b/2 \rfloor \left\lfloor n_{SRS} / \prod_{b'=b_{hop}}^{b-1} N'_b \right\rfloor & \text{if } N_b \text{ odd} \end{cases} \quad \text{[Equation 13]}$$

where, $n_{SRS}$ is a parameter used to calculate the number of times of transmitting the SRS and is defined by Equation 14.

$$n_{SRS} = \quad \text{[Equation 14]}$$
$$\begin{cases} 2N_{SP}n_f + 2(N_{SP}-1)\left\lfloor \dfrac{n_s}{10} \right\rfloor + \left\lfloor \dfrac{T_{offset}}{T_{offset\_max}} \right\rfloor, & \text{for 2ms SRS periodicity of TDD frame structure} \\ \lfloor (n_f \times 10 + \lfloor n_s/2 \rfloor)/T_{SRS} \rfloor, & \text{otherwise} \end{cases}$$

In Equation 14, $T_{SRS}$ denotes the periodicity of an SRS and $T_{offset}$ denotes a subframe offset of an SRS. In addition, $n_s$ denotes a slot number and $n_f$ denotes a frame number.

A UE-specific SRS configuration index $I_{SRS}$ for setting the periodicity $T_{SRS}$ and the subframe offset $T_{offset}$ a UE-specific SRS signal is shown in Table 7-Table 10 according to FDD and TDD. In particular, Table 7 and Table 8 indicate a FDD system and a TDD system, respectively. Table 7 and Table 8 in the following show a period related to a triggering type 0, i.e., a periodic SRS, and offset information.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 8

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

Meanwhile, in case of the periodic SRS, transmission is performed in a subframe satisfying Equation 15 in the following in a FDD system or a TDD system where $T_{SRS}$ is greater than 2 ($T_{SRS}>2$). Yet, in Equation 15, $k_{SRS}$ corresponds to $\{0, 1, \ldots, 9\}$ in case of the FDD system, whereas $k_{SRS}$ is determined according to Table 9 in the following in case of the TDD system.

$$(10 \cdot n_f + k_{SRS} - T_{offset}) \bmod T_{SRS} = 0 \quad \text{[Equation 15]}$$

Table 10 and Table 11 in the following show a period related to a triggering type 1, i.e., an aperiodic SRS, and offset information. In particular, Table 10 and Table 11 indicate a FDD system and a TDD system, respectively.

TABLE 10

| SRS Configuration Index $I_{SRS}$ | SRS Periodicity $T_{SRS, 1}$ (ms) | SRS Subframe Offset $T_{offset, 1}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-31 | reserved | reserved |

TABLE 11

| SRS Configuration Index $I_{SRS}$ | SRS Periodicity $T_{SRS, 1}$ (ms) | SRS Subframe Offset $T_{offset, 1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-31 | reserved | reserved |

Meanwhile, if a triggering bit of the aperiodic SRS is detected in a subframe #n, an aperiodic SRS corresponding to the triggering bit is transmitted in a first subframe satisfying Equation 17 or Equation 18 in the following appearing after a subframe index #n+k (where k≥4). In particular, Equation 17 in the following is used for a FDD system or a TDD system of which $T_{SRS}$ is greater than 2 ($T_{SRS}>2$) in the Table 11. Equation 18 in the following is used for a TDD system of which $T_{SRS}$ is equal to 2 ($T_{SRS}=2$) in the Table 11. Yet, in case of the FDD system, $k_{SRS}$ corresponds to $\{0, 1, \ldots, 9\}$. In case of the TDD system, $k_{SRS}$ is determined according to the Table 9.

$$(10 \cdot n_f + k_{SRS} - T_{offset,1}) \bmod T_{SRS,1} = 0 \quad \text{[Equation 17]}$$

$$(k_{SRS} - T_{offset,1}) \bmod 5 = 0 \quad \text{[Equation 18]}$$

TABLE 9

| | subframe index n | | | | | | | | | |
|---|---|---|---|---|---|---|---|---|---|---|
| | 1 | | | | | 6 | | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | | 1 | | 2 | 3 | 4 | | | 6 | 7 | 8 | 9 |

And, in case of a TDD system where $T_{SRS}$ corresponds to 2 in Table 8, transmission is performed in a subframe satisfying Equation 16 in the following.

$$(k_{SRS} - T_{offset}) \bmod 5 = 0 \quad \text{[Equation 16]}$$

D2D (Device to Device) Communication

In the following, D2D communication based on LTE system is explained. D2D can be referred to as direct communication between UEs or a sidelink. In general, a UE corresponds to a terminal of a user. If such a network device as an eNB transmits and receives a signal according to a D2D communication scheme, the network device can also be considered as a UE as well.

FIG. 8 is a diagram illustrating exemplary scenarios of D2D communication. D2D resources can be allocated from a UL resource (e.g., In case of FDD, a UL frequency resource. In case of TDD, a UL subframe). (a) In case of in-coverage D2D communication, a network controls D2D resources used for D2D communication. The network may allocate a specific resource to a transmission UE or may allocate a pool of D2D resources capable of being selected by a UE. (b) In case of out-of-coverage D2D communication, since a network is unable to directly control a D2D resource, a UE uses a preconfigured D2D resource. (c) In case of partial coverage D2D communication, a UE, which is located at the outside of the coverage, is able to use preconfigured parameters. On the contrary, a UE, which is located within the coverage, is able to use a D2D resource obtained from the network.

For clarity, assume that a UE1 selects a resource unit (RU) corresponding to a specific D2D resource from a resource pool and the UE1 transmits a D2D signal using the selected RS. A resource pool corresponds to a set of D2D resources. Assume that a UE2 corresponding to a reception UE receives information on a resource pool in which the UE1 is able to transmit a signal and detects a signal of the UE1 in the resource pool. In this case, if the UE1 is located within a connection range of an eNB, the eNB can inform the UE1 of information on the resource pool. If the UE1 is located at the outside of the connection range of the eNB, the resource pool can be informed by a different UE or can be determined by a predetermined resource. In general, a resource pool includes a plurality of RUs. A UE selects one or more RUs and may be able to use the selected RUs for transmitting a D2D signal of the UE.

Figure 9:
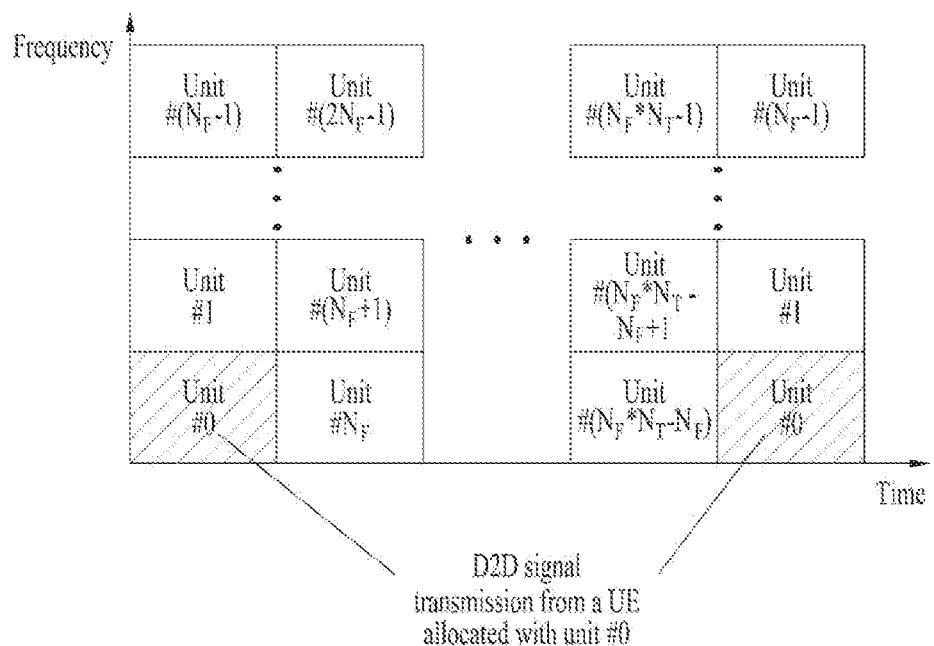
FIG. 9 is a diagram illustrating an example of a D2D RU.

FIG. 9 is a diagram illustrating an example of a D2D RU. For clarity, assume that the entire frequency resources are divided into the $N_F$ number of resource units and the entire time resources are divided into the $N_T$ number of resource units.

In FIG. 9, a resource pool can be repeated with a period of $N_T$ subframes. For example, as shown in FIG. 9, one resource unit may periodically and repeatedly appear.

Or, an index of a physical RU to which a logical RU is mapped may change based on a predetermined pattern over time to obtain a diversity gain in time domain and/or frequency domain. In this RU structure, a resource pool may correspond to a set of resource units capable of being used by a UE intending to transmit a D2D signal.

The aforementioned resource pool can be classified into various types. For example, the resource pool can be classified according to contents of a D2D signal transmitted via each resource pool. For example, the contents of the D2D signal can be classified as follows and a separate resource pool can be configured according to contents of each D2D signal.

Scheduling assignment (SA): The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical RU in a manner of being multiplexed with D2D data. In this case, an SA resource pool may correspond to a pool of resources that an SA and D2D data are transmitted in a manner of being multiplexed. The SA can be referred to as an SCI (side link control channel) and can be transmitted via a D2D control channel (e.g., PSCCH).

D2D data channel: The D2D data channel corresponds to a channel for transmitting user data scheduled by the SA. It may be able to configure a pool of resources for the D2D data channel.

Discovery channel: The discovery channel corresponds to a channel for transmitting a discovery signal including information on an ID of a transmission UE, and the like to enable a neighboring UE to discover the transmission UE. It may be able to configure a resource pool for the discovery channel.

Meanwhile, although contents of D2D signal are identical to each other, it may use a different resource pool according to a transmission/reception attribute of the D2D signal. For example, in case of a D2D data channel of the same type or a discovery channel of the same type, the D2D data channel or the discovery channel can be transmitted in a different resource pool in consideration of (i) a transmission timing determination scheme of a D2D signal (e.g., whether a D2D signal is transmitted at the time of receiving a synchronization reference signal or the timing to which a prescribed timing advance is added), (ii) a resource allocation scheme (e.g., whether a transmission resource of an individual D2D signal is designated by an eNB or a transmission UE autonomously selects a D2D signal transmission resource from a resource pool), (iii) a signal format (e.g., number of symbols occupied by a D2D signal in a subframe, number of subframes used for transmitting a D2D signal), (iv) signal strength from an eNB, (v) strength of transmit power of a D2D UE, and the like.

As mentioned in the foregoing description, such a term as 'D2D' can also be referred to as 'SL (side link)' and 'SA' can also be referred to as PSSCH (physical sidelink control channel). A D2D synchronization signal can be referred to as an SSS (sidelink synchronization signal) and the SSS can be transmitted via a PSBCH (physical sidelink broadcast channel). The PSBCH transmits most basic information (e.g., system information such as SL-MIB, etc.) prior to D2D communication and can also be referred to as a PD2DSCH (physical D2D synchronization channel). A UE transmits a signal (e.g., a discovery signal including an ID of the UE) to a neighboring UE using a discovery channel to inform the neighboring UE of the existence of the UE. The discovery channel is referred to as a PSDCH (physical sidelink discovery channel).

D2D communication of a narrow sense can be distinguished from D2D discovery. For example, if only a UE performing the D2D communication of a narrow sense transmits PSBCH together with SSS (except a UE performing D2D discovery), the SSS can be measured using a DMRS of the PSBCH. An out-of-coverage UE measures the DMRS of the PSBCH (e.g., RSRP, etc.) and may be then able to determine whether or not the UE becomes a synchronization source based on a measurement result.

Figure 10:
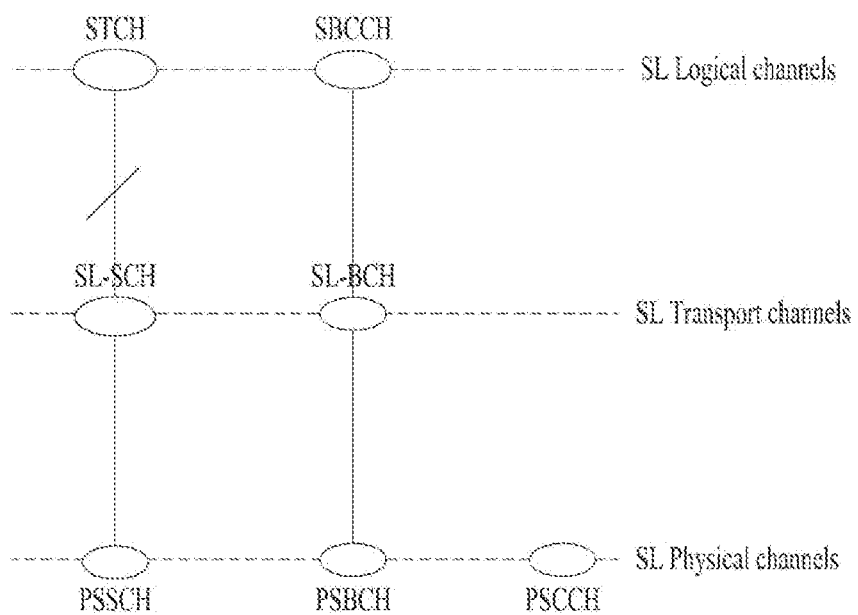
FIG. 10 is a diagram illustrating SL (side link) channels.

FIG. 10 is a diagram illustrating SL (side link) channels. The SL channels shown in FIG. 9 may correspond to channels for performing D2D communication (e.g., D2D communication of a narrow sense).

Referring to FIG. 10, STCH (SL traffic channel) and SBCCH (SL broadcast control channel) correspond to logical channels. The STCH transmits user data received from an application and is connected with SL-SCH (SL shared channel). The SL-SCH corresponding to a transport channel is connected with PSSCH (physical SL shared channel). The SC-SCH signals information necessary for performing synchronization in out-of-coverage or partial coverage scenario or information necessary for performing synchronization between UEs belonging to a different cell. The SBCCH is connected with SL-BCH corresponding to a transport channel. The SC-BCH is connected with PSBCH.

PSCCH (physical SL control channel) performs a role similar to a role of PDCCH in legacy communication performed between a UE and an eNB. The PSCCH is used to transmit SA (scheduling assignment). The SA can also be referred to as SCI (sidelink control information).

For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

For example, in the mode 1, an eNB designates a resource to be used for D2D communication in a resource pool. In the mode 2, a UE selects a resource pool from a set of allocated resource pools and may be able to directly select a D2D resource to be used from the selected resource pool. Hence, it is necessary for the UE to be in an RRC connected state in the mode 1. On the contrary, the UE may be in an RRC idle state or an out-of-coverage state in the mode 2.

Figure 11:
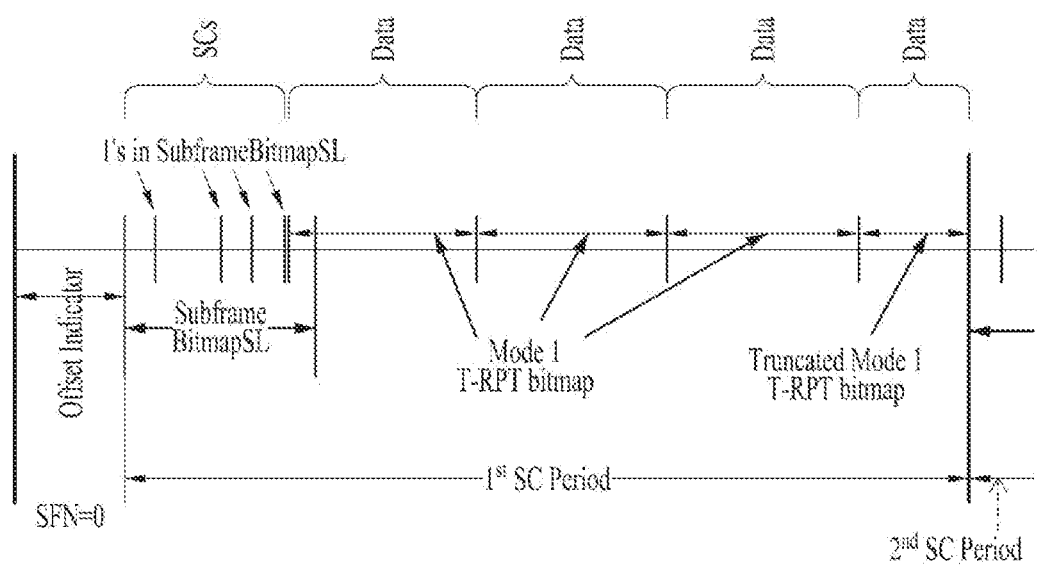
FIG. 11 is a diagram illustrating a D2D communication mode 1.

FIG. 11 is a diagram illustrating a D2D communication mode 1. According to a PSSCH/PSSCH structure for performing D2D communication, a set of subframes (i.e., a subframe bitmap) is divided into two regions (e.g., a control region and a data region). Whether or not a subframe is usable for D2D communication can be indicated via a subframe bitmap.

Referring to FIG. 11, an SC period (SL control period) starts from an offset of SFN=0 and can be periodically repeated. The SC period starts from a control region including SCI transmitted by PSCCH and 'SubframeBitmapSL' corresponding to a higher layer parameter indicates a subframe in which PSCCH is transmitted. A data region starts after the last bit configured by 1 in the 'SubframeBitmapSL'. The data region corresponds to a T-RPT bitmap corresponding to a different bitmap. The T-RPT bitmap indicates subframes in which data is transmitted. As shown in FIG. 11, a subframe pattern indicated by the T-RPT bitmap is repeated until the SC period ends. The last T-RPT bitmap is truncated according to the end of the SC-period. The T-RPT bitmap can be dynamically configured and can be differently configured according to each SC-period and each UE.

In most part, the mode 2 operates in a manner of being similar to the mode 1 shown in FIG. 11. Yet, there is a difference between the mode 1 and the mode 2 in that a start point of a data region is not determined based on SubframeBitmapSL in the mode 2. In the mode 2, the start point of the data region has a fixed offset from a start point of an SC period.

Vehicle to Everything (V2X) Communication

The present invention proposes methods for an RSU (road side unit) or an eNB to smoothly receive a signal transmitted by a V-UE (vehicle-UE) in V2X communication according to embodiment of the present invention. For clarity, a vehicle user equipment is referred to as a V-UE and the eNB or the RSU is referred to as a F-node (fixed node). The eNB or the RSU can be installed in an ITS (intelligent transport system)-dedicated carrier.

Since a position of the RSU or the eNB is fixed, when the RSU or the eNB receives a signal transmitted from a specific V-UE, it is highly probable that ICI (inter-carrier interference) occurs less compared to a case of receiving the signal by a different V-UE. This is because, if one of a transmitter and a receiver is fixed, Doppler shift/effect occurs less compared to a case that both the transmitter and the receiver move at the same time. Moreover, since the position of the RSU or the eNB is fixed and planning of a region to which the RSU or the eNB is installed is possible, it is relatively easy to perform power control on the RSU or the eNB. In particular, since a message transmitted by a UE has a broadcasting characteristic, if the message is transmitted to all UEs, it is difficult to perform power control on a specific receiver. However, UEs can perform power control on a fixed node and can make the fixed node smoothly receive messages.

Hence, if a V-UE applies open loop power control (OLPC) to a signal transmitted to the RSU or the eNB, it may be able to reduce in-band emission when the RSU or the eNB receives the signal. In particular, when the RSU or the eNB receives signals to which FDM (frequency divisional multiplexing) is applied, it may be able to enhance performance of receiving the signals. For example, assume a case that a V-UE1 located at a position relatively close to the RSU and a V-UE2 located at a position far from the RSU respectively transmit a signal via frequencies adjacent to each other. If the V-UE1 and the V-UE2 transmit a signal using the same transmit power without OLPC (e.g., without considering pathloss and the like according to a distance), the signal of the V-UE1 arriving at the RSU has a high reception power value. On the contrary, the signal of the V-UE2 has a low reception power value. Consequently, since the high reception power of the V-UE1 signal causes strong interference to a frequency band at which the signal of the V-UE2 is located (e.g., In-band emission, the in-band emission occurs due to a practical problem of circuit implementation. Although OFDM is performed, since it is difficult to have perfect orthogonality between subcarriers and a signal of a certain level is leaked out, interference occurs.), it is difficult for the RSU to properly receive the signal of the V-UE2.

It may be not preferable to apply the OLPC to all V2X signal transmissions in terms of signal transmission and reception between vehicles (V2V). In other word, although the OLPC is appropriate for enhancing performance of receiving a signal of a fixed and specific RSU or an eNB, the OLPC is not appropriate for transmitting and receiving a signal between vehicles (V2V). For example, when a signal is transmitted and received between vehicles (V2V), since the signal is transmitted and received by a plurality of unspecified V-UEs, it is difficult for a transmission V-UE to specify a reception V-UE. And, since each of reception V-UEs has mobility, although power control is performed, the power control is imperfectly performed as time goes by and it is probable that the power control causes unnecessary interference. Hence, when the transmission V-UE applies the OLPC on the basis of a reception node, it is inefficient in transmitting and receiving a signal between vehicles (V2V). In particular, a method of applying the OLPC all the time may be inefficient in D2D communication.

In the following, methods for an eNB or an RSU to guarantee performance of V2V while more smoothly receiving a signal transmitted by a V-UE are explained.

Proposal #1

An OLPC resource pool can be configured with a prescribed period for the reception of an F-node. The OLPC resource pool can be referred to as an OLPC resource region, or simply, an OLPC region. A V-UE configured to transmit a signal can apply OLPC to a signal transmitted in the OLPC resource region.

Information on the OLPC resource region and/or an OLPC parameter (e.g., $P_0$, $\alpha$, and/or cell ID becoming a reference of OLPC) can be signaled to the V-UE. For example, the information on the OLPC resource region and the OLPC parameter can be signaled to the V-UE via an LTE carrier from an ITS server. Or, the information on the OLPC resource region and the OLPC parameter can be signaled (e.g., physical layer signaling or higher layer signaling) from an F-node installed in a dedicated carrier (e.g., 5.9 GHz) for ITS.

If a cell ID or a fixed node ID, which becomes a reference for separate OLPC, for measuring PL (pathloss) is not signaled to UEs, a V-UE is able to measure PL of an F-node having strongest reception power among signals received on an ITS-dedicated carrier. The V-UE can transmit a signal by applying OLPC based on the measured PL.

It is preferable for the V-UE to configure a relation between a period of transmitting a message transmitted by the V-UE and a period of an OLPC resource region not to have a relation of a multiple number or a relation of an aliquot. If the period of transmitting a message transmitted by the V-UE is configured by a multiple of the periodicity of the OLPC resource region and a first transmission of a message is performed in the OLPC resource region, it may have a problem that all messages to be transmitted after the first transmission are transmitted in the OLPC resource region. In order to prevent the V-UE from transmitting a signal by consistently or too frequently applying OLPC, it may be able to configure a relation between a periodicity of the OLPC resource region and a message transmission periodicity of the V-UE not to have a relation of a multiple number (or a relation of an aliquot).

For example, if it is assumed that V-UEs generate and transmit a periodic message in every 100 ms, for example, a periodicity of the OLPC resource region can be configured by 70 ms rather than a relation of a multiple number.

In order to distribute signal transmission occasions as much as possible in the OLPC resource region, a periodicity of the OLPC resource region can be configured by a relative prime value with a period of transmitting a message of a V-UE (e.g., a message periodically transmitted by the V-UE). For example, when the V-UE transmits a message with a period of 100 ms, the periodicity of the OLPC resource region can be selected from among values relative prime with 100.

In particular, the V-UE can generate and transmit a message according to a prescribed period or occurrence of a specific event. If transmission is performed in the OLPC resource region, it may be able to transmit a signal by applying OLPC to the signal. Hence, an F-node can smoothly receive the signal of the V-UE in the OLPC resource region. A resource region or a resource pool can be distinguished according to a power control scheme. For example, a resource region can be distinguished according to a power control scheme (e.g., whether or not OLPC is applied) rather than a message form (or, type). If V-UEs transmit a signal in the OLPC resource region, the F-node can forward or relay at least a part of the V-UE signal received via the OLPC resource region to a different network node.

According to the present embodiment, although the F-node is unable to receive all signals transmitted by the V-UE, the F-node opportunistically receives a signal of the V-UE and forwards the signal to enhance average V2V performance.

Meanwhile, although it is able to distinguish the OLPC resource region from a different resource region (e.g., a resource region to which OLPC is not applied) on a single CC, depending on an embodiment, it may configure the OLPC to be always applied to a specific CC among a plurality of CCs. For example, the OLPC resource region and a different resource region can be set to a different frequency region. More specifically, the OLPC resource region and a different resource region can be set to a different carrier. While a V-UE transmits a message (e.g., V2V message) via a plurality of CCs in a manner of alternately using a plurality of the CCs, when the V-UE transmits a message on a specific CC (e.g., OLPC CC), the V-UE can transmit the message by applying OLPC to the message. In this case, since it is able to install the F-node in the specific CC (e.g., OLPC CC) only, installation cost of the F-node can be reduced.

Figure 12:
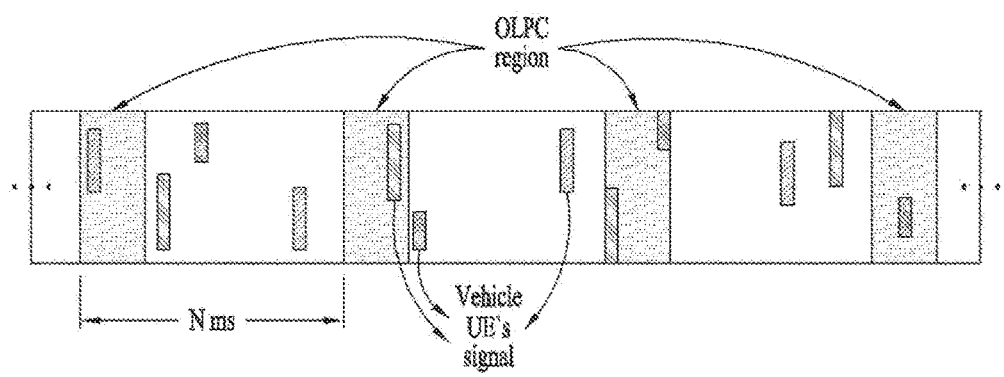
FIGS. 12 to 14 are diagrams illustrating OLPC resource regions according to embodiments of the present invention.
Figure 13:
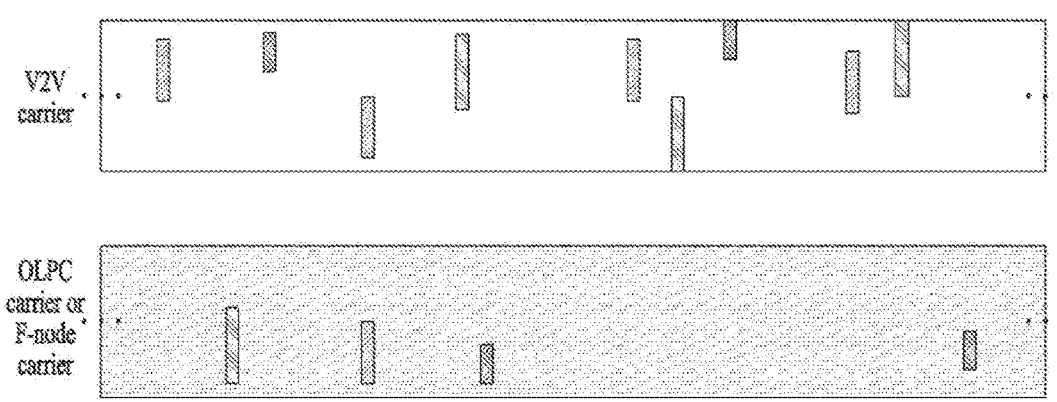
Figure 14:
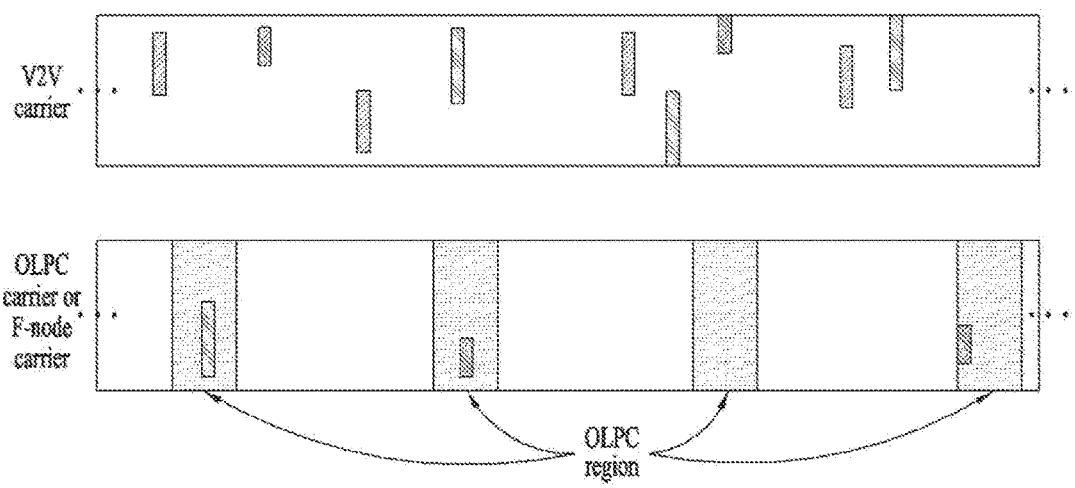

FIGS. 12 to 14 are diagrams illustrating OLPC resource regions according to embodiments of the present invention.

Referring to FIG. 12, an OLPC resource region is periodically (e.g., in every N number of subframes) configured along with a time axis in a single carrier. Each of V-UEs transmits a message to which OLPC is applied in the OLPC resource region only and transmits a signal using separate power or a separately configured power control parameter in other regions.

Referring to FIG. 13, it illustrates a case that a specific CC is configured by the OLPC resource region.

FIG. 14 illustrates a case that the OLPC resource region configuration method shown in FIG. 12 is combined with the OLPC resource region configuration method shown in FIG. 13. Referring to FIG. 14, the OLPC resource region is configured in a specific CC only. Yet, although transmission is performed on the specific CC, OLPC is not applied all the time. In particular, only a partial resource region of the specific CC can be configured as the OLPC resource region. The remaining resource region of the specific CC can be used for a different usage. For example, channel sensing, control information transmission, contention resolution, and the like can be performed in the remaining resource region.

Proposal #2

The aforementioned OLPC resource region (e.g., an OLPC CC, a control CC, or an OLPC resource region configured within a single CC) is configured to make an F-node more smoothly receive a signal of a V-UE. In this case, when the F-node receives the signal, in order to make the F-node forward the signal to a different V-UE, it is necessary for the F-node to transmit a signal with a higher priority. For example, if a different V-UE also transmits a signal of the different V-UE at the timing at which the F-node transmits a signal, the different UE may fail to properly receive the signal transmitted by the F-node. Hence, it is preferable to configure the signal transmission of the F-node to have a higher priority compared to a priority of the signal transmission of the different V-UE.

In particular, due to a half-duplex constraint, it may be impossible to transmit and receive a signal between V-UEs. In this case, the half-duplex constraint means that a UE is unable to perform transmission and reception at the same time while transmitting a signal on a specific band. In order to overcome the half-duplex constraint, recently, discussion on an in-band full duplex scheme is in progress. Yet, the in-band full duplex scheme has a demerit in that implementation complexity of a UE is excessively increased. In particular, when the half-duplex constraint causes a problem, the F-node may solve a signal exchange problem between V-UEs. For example, due to the half-duplex constraint, although a V-UE is able to perform either transmission or reception in the same time-frequency resource, the V-UE is unable to perform transmission and the reception at the same time. For example, when a V-UE1 transmits a first signal, if a V-UE2 transmits a second signal via the same resource, the V-UE2 is unable to receive the first signal of the V-UE1. In this case, the F-node receives the first signal of the V-UE1, which is failed to be received by the V-UE2, and can provide the first signal of the V-UE1 to the V-UE2.

According to one embodiment of the present invention, in order to make all V-UEs receive a signal transmitted by the F-node, transmission of a V-UE is restricted in a resource region in which the signal of the F-node is transmitted. Or, it may be able to configure a resource region in which transmission of a V-UE is restricted. The resource region may correspond to a resource region in which transmission of the F-node is available only. For clarity, the resource region is referred to as an F-node transmission resource region or, simply, an F-node transmission region. The F-node may forward all or a part of data, which is previously received by the V-UE via the OLPC resource region, to a different V-UE via the F-node transmission resource region.

Among data of the V-UE received in the OLPC resource region positioned after the F-node transmission resource region, the F-node selects data not violating delay constraint of the V-UE from among the data and can transmit the selected data to the current F-node transmission resource region. Or, the F-node selects data not violating the delay constraint of the V-UE from among data of all V-UEs received after the F-node transmission resource region and can transmit the selected data.

The delay constraint of the V-UE is used for determining whether or not a signal transmitted by the V-UE is valid or can be used for determining whether or not it is necessary to forward (or, relay) the signal transmitted by the V-UE. For example, in order to prevent a signal transmitted by a source V-UE from being infinitely forwarded via a different UE or the F-node, it may be able to configure the delay constraint of the V-UE.

To this end, the V-UE can transmit all or a part of (i) information on timing at which a message is generated by the V-UE, (ii) information on timing at which the message is finally forwarded, or (iii) information on message generation timing and maximum delay constraint permitted from the message generation timing (hereinafter, 'time stamp information') via a MAC header or a V-UE message (e.g., physical layer signaling or higher layer signaling). F-nodes can determine whether to relay a message or whether or not it is necessary to perform relay by exceeding the delay constraint based on the time stamp information.

Meanwhile, F-nodes can determine whether to relay a message by decoding a part of a message only received from a V-UE rather than decoding the whole of the message. To this end, it may be able to encode time stamp information generated in higher layer using a channel coding scheme separated from a channel coding scheme for data. In this case, the time stamp information can be transmitted on a D2D channel separated from a D2D channel for data.

For example, the V-UE can transmit the time stamp information by including the time stamp information in control information. The time stamp information can be transmitted on PSCCH. Specifically, a specific field (e.g., TA field) of a PSCCH format 0 can be reused for transmitting the time stamp information. Or, it may be able to newly define a PSSCH format including the time stamp information.

Or, the V-UE can transmit the time stamp information by including the time stamp information in a discovery message. Or, similar to a case of performing piggyback on CSI/RI/PMI on PUSCH, the time stamp information of the V-UE can be transmitted in a manner of being multiplexed with data.

The abovementioned method can also be effectively used for relaying a message relayed by the V-UE. For example, when the V-UE receives a signal of a different V-UE, the V-UE is able to determine whether to perform relay without decoding the whole of the message. And, a reception UE identifies when the message is firstly transmitted, decodes PSCCH only, and can determine whether to perform decoding on the PSSCH. Since the UE does not perform unnecessary message decoding, it may be able to reduce power consumption of the UE.

Figure 15:
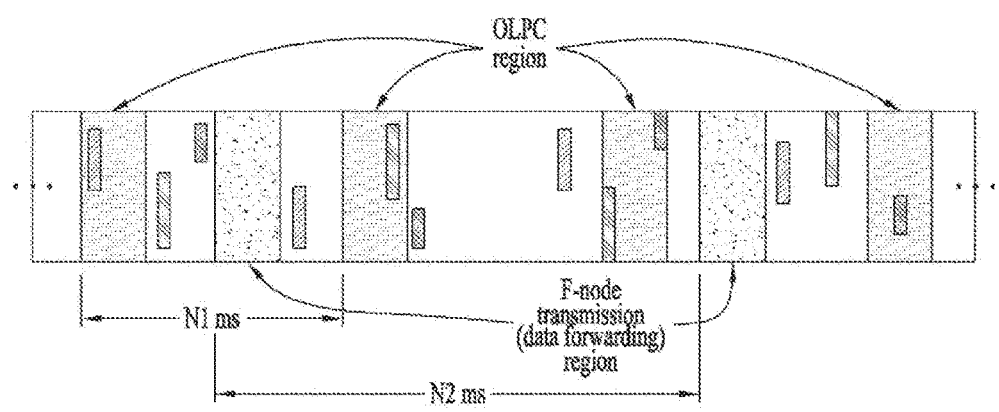
FIGS. 15 and 16 are diagrams illustrating F-node transmission resource regions according to embodiments of the present invention.

FIG. 15 is a diagram illustrating an F-node transmission resource region according to one embodiment of the present invention. Referring to FIG. 15, an OLPC resource region and an F-node transmission resource region are configured on a single CC. For example, the OLPC resource region is configured with a period of N1 ms and the F-node transmission resource region is configured with a period of N2 ms. F-nodes can transmit a message of a V-UE not exceeding delay constraint among signals of the V-UE received prior to a specific F-node transmission periodicity (e.g., after a previous F-node transmission periodicity or a current F-node transmission periodicity).

According to the embodiment of the present invention, if a part of F-nodes performs reception rather than transmission even in an F-node transmission resource region, a relaying operation can be performed between F-nodes. For example, when an F-node 1 transmits a signal in a specific F-node transmission resource region, an F-node 2 can receive the signal of the F-node 1 instead of performing transmission in the specific F-node transmission resource region. Subsequently, the F-node 2 can transmit (i.e., relay) the signal received from the F-node 1 in a different F-node transmission resource region.

To this end, when F-node transmission resource regions are configured, F-nodes can perform probability-based transmission in each of the F-node transmission resource regions. For example, if F-nodes are configured not to perform the probability-based transmission, the F-nodes can perform reception. Or, a transmission periodicity and a period offset can be differently configured according to each F-node. Or, among a plurality of transmission resource regions, F-node transmission resource regions in which a transmission is actually performed by a corresponding F-node can be configured in advance.

Figure 16:
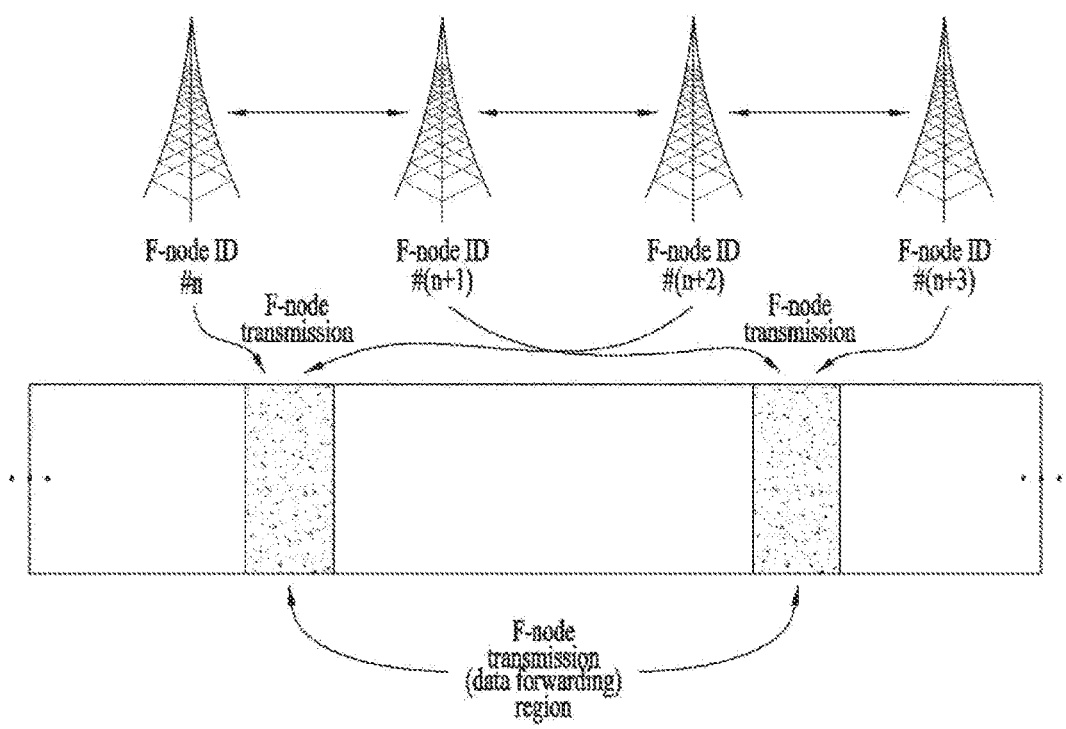

FIG. 16 is a diagram illustrating an F-node transmission resource region according to a different embodiment of the present invention. According to the embodiment shown in FIG. 16, a transmission periodicity of even-numbered F-nodes is configured in a manner of being different from a transmission periodicity of odd-numbered F-nodes. In the transmission periodicity for which the even-numbered F-nodes perform transmission, the odd-numbered F-nodes perform a data reception operation to receive signals of the even-numbered F-nodes. Subsequently, the odd-numbered F-nodes transmit the signals received from the even-numbered F-nodes in F-node transmission resource region of the odd-numbered F-nodes or transmit the signals in a resource in which the V-UE performs transmission (or, reception) to make a different V-UE receive the signals.

Proposal #3

When a V-UE transmits a message to which OLPC is applied to an F-node, the message is not restricted to a message of a specific type. Yet, when the V-UE intends to transmit the message of the specific type, it may be able to define a rule that the message of the specific type is to be transmitted in an OLPC resource region at least one time.

For example, in case of an event-triggered message, the V-UE transmits the message in a region rather than the OLPC resource region for V2V and transmits the same message in the OLPC resource region again to make F-nodes receive the message at least one time. In particular, since the event-triggered message is more important than a periodic message, it is preferable for an F-node to overhear and relay the event-triggered message. Other V-UEs can also receive the event-triggered message via the F-node.

Proposal #4

If V-UEs belong to a different PLMN (Public Land Mobile Network), in order to perform OLPC on an ITS carrier, it is necessary to determine a method of configuring (i) a reference F-node of PL calculation and/or (ii) power control parameters (e.g., P0, aα).

(1) According to one embodiment, each V-UE directly measures signals of F-nodes installed in an ITS transmission carrier and can determine PL on the basis of RSRP of an F-node of a strongest signal. The F-nodes installed in the ITS carrier can directly signal an OLPC parameter to a V-UE (via physical layer signaling or higher layer signaling). Or, if an ITS service provider configures an OLPC parameter and signals the OLPC parameter to each operator, each of the service provider can signal the OLPC parameter to the V-UE using an LTE band. In the present embodiment, an eNB/RSU of 5.9 GHz is installed by a third party service provider or an ITS service provider. In the present embodiment, it is assumed that V-UEs of a different service provider are also able to transceive a signal with the eNB/RSU of 5.9 GHz.

(2) It may be able to configure V-UEs of a specific service provider to perform transmission in a specific resource region only. For example, there may exist a first OLPC resource region for a V-UE of a first service provider and a second OLPC resource region for a V-UE of a second service provider, respectively. Each of the V-UEs can measure and use PL via an LTE carrier of an eNB of a corresponding service provider. Yet, LTE carrier can signal P0 and α to V-UEs of a corresponding service provider. In the present embodiment, it is assumed that an ITS controller divides a resource region (e.g., OLPC resource region) of an ITS carrier in which overhearing is to be performed by an eNB (e.g., F-node) according to a service provider. For example, the ITS controller can configure an overhearing resource region on an ITS-dedicated carrier in advance for an F-node or configure the overhearing resource region via network signaling. It may be able to configure V-UEs of a specific service provider to perform transmission to which OLPC is applied in the overhearing resource region only.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

Summary

The aforementioned contents can be briefly summarized as follows.

Although WAN does not exist on a V2X band (e.g., 5.9 GHz), if OLPC is applied to the band, it is advantageous for an eNB/RSU to overhear a V-UE. A node (e.g., eNB/RSU) of a certain type can perform power control for overhearing. If OLPC is applied, since in-band emission is reduced, the eNB/RSU can more smoothly receive signals on which FDM is performed. Since the eNB/RSU corresponds to a fixed node, if OLPC is applied, since ICI (inter-carrier interference) impact is reduced, it is profitable for the eNB/RSU to receive a signal. Assume that the eNB/RSU performs reception on an ITS carrier.

Issue (1): If OLPC is applied, although it is able to enhance performance of the eNB or the RSU, V2V performance can be degraded. As a solution for the problem above, it may consider configuring an OLPC resource region with a prescribed period. For example, a V-UE applies OLPC in the OLPC resource region only and may perform transmission with fixed power in a different resource region. This can be comprehended as a resource region is defined in the aspect of power. When a V-UE periodically/aperiodically transmits a message, if transmission is performed in a specific resource region, OLPC is applied. It is preferable that there is a relation of a relative prime between a periodicity of the OLPC resource region and a period of transmitting a message transmitted by the V-UE. The V-UE applies the OLPC to the eNB or the RSU in the OLPC resource region to transmit a signal.

Issue (2): When the V-UE applies the OLPC to transmit a signal to the eNB or the RSU, it is necessary to determine a message to which the OLPC is to be applied. (i) As a first method, it may consider a method of applying the OLPC to all messages transmitted in the OLPC resource region irrespective of a message type. However, there may exist a message not transmitted in the OLPC resource region. In this case, the eNB/RSU is unable to overhear the message. (ii) As a second method, when a message is transmitted in a resource region to which the OLPC is not applied, the message can be transmitted again in the OLPC resource region. This method can be restrictively applied to an event trigger-based message transmission only. This is because, since a message transmitted based on an event trigger has relative higher importance, it is necessary for the eNB or the RSU to overhear the message. Hence, the V-UE can transmit the event trigger-based message at least one time in the OLPC resource region. (iii) As a third method, the V-UE generates a message to be overheard by the eNB/RSU irrespective of a message for V2V and may be then able to transmit the message in a manner of applying the OLPC to the message. The message to be overheard by the eNB/RSU can be reconfigured with a form different from a form of the message for V2V.

Issue (3): When V-UEs belong to a different PLMN, it is necessary to determine a method of configuring a reference cell/RSU of PL calculation and a power control parameter (e.g., P0, α). (i) As a first method, a V-UE directly measures eNBs/RSUs installed in 5.9 GHz (or, a separate V2X band) and can determine PL on the basis of RSRP of an eNB/RSU of which signal strength is strongest. An OLPC parameter can be signaled by the eNB/RSUs installed in 5.9 GHz. Or, each service provider may signal a parameter provided by an ITS service provider to the V-UE via an LTE band. The eNB/RSUs installed in 5.9 GHz are installed by a third party service provider or an ITS service provider. It may assume that UEs belonging to a different PLMN are able to transceive a signal with the eNBs/RSUs on 5.9 GHz. (ii) As a second method, an OLPC resource region can be differently configured according to a service provider. Only V-UEs of a specific service provider can perform transmission in a specific OLPC resource region and a V-UE can measure PL from an eNB on an LTE carrier of the service provider and use the PL. P0 and α can be signaled to the V-UEs of the service provider on the LTE carrier. An ITS controller can determine a resource region to be overheard by an eNB according to a service provider on an ITS carrier.

Figure 17:
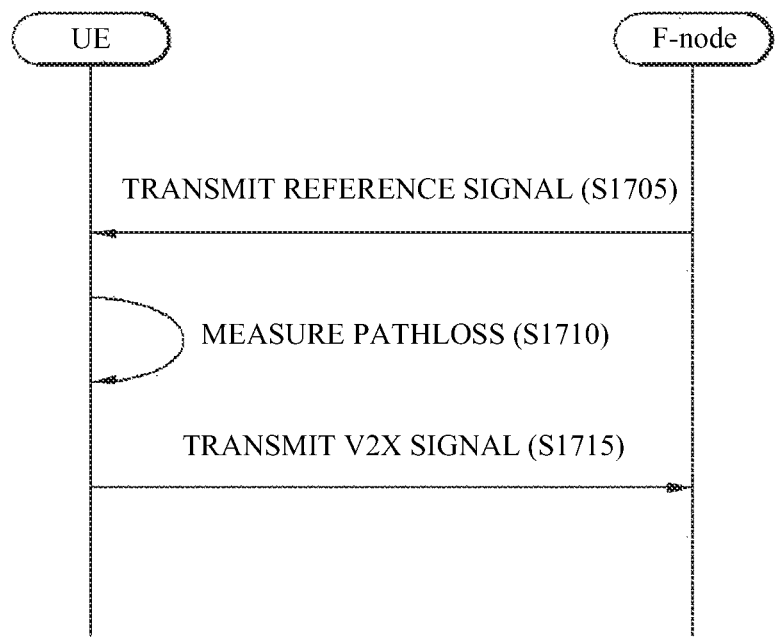
FIG. 17 is a flowchart for a method of transmitting and receiving a V2X signal according to one embodiment of the present invention.

FIG. 17 is a flowchart for a method of transmitting and receiving a V2X signal according to one embodiment of the present invention. Explanation on contents overlapped with the aforementioned content can be omitted.

Referring to FIG. 17, a fixed node (e.g., eNB/RSU) transmits a reference signal to a UE (V-UE) [S1705].

The UE measures a pathloss between the fixed node and the UE [S1710]. The reference signal can be used for measuring the pathloss between the UE and the fixed node.

And, the reference signal can also be used for the UE to select the fixed node. For example, the UE can select a fixed node having highest reception power from among fixed nodes adjacent to the UE.

The UE can transmit a V2X signal based on a V2X transmission periodicity or an event trigger [S1715].

If transmission of the V2X signal is performed in a periodically configured open loop power control (OLPC) resource region, transmit power of the V2X signal can be determined based on the measured pathloss.

A periodicity of the OLPC resource region can be configured independently of a V2X transmission periodicity. For example, the periodicity of the OLPC resource region can be configured as a value relative prime with the V2X transmission periodicity.

If the transmission of the V2X signal is performed based on an event trigger, the UE can be configured to transmit a V2X signal at least one time in the OLPC resource region.

The periodically configured OLPC resource region can include a first region where the fixed node overhears a V2X signal and a second region where the fixed node performs transmission. The fixed node can transmit a V2X signal overheard by the fixed node to a different fixed node in the second region.

If a V2X signal is transmitted in a different resource region, transmit power of the V2X signal can be fixed to a prescribed value irrespective of the measured pathloss.

Figure 18:
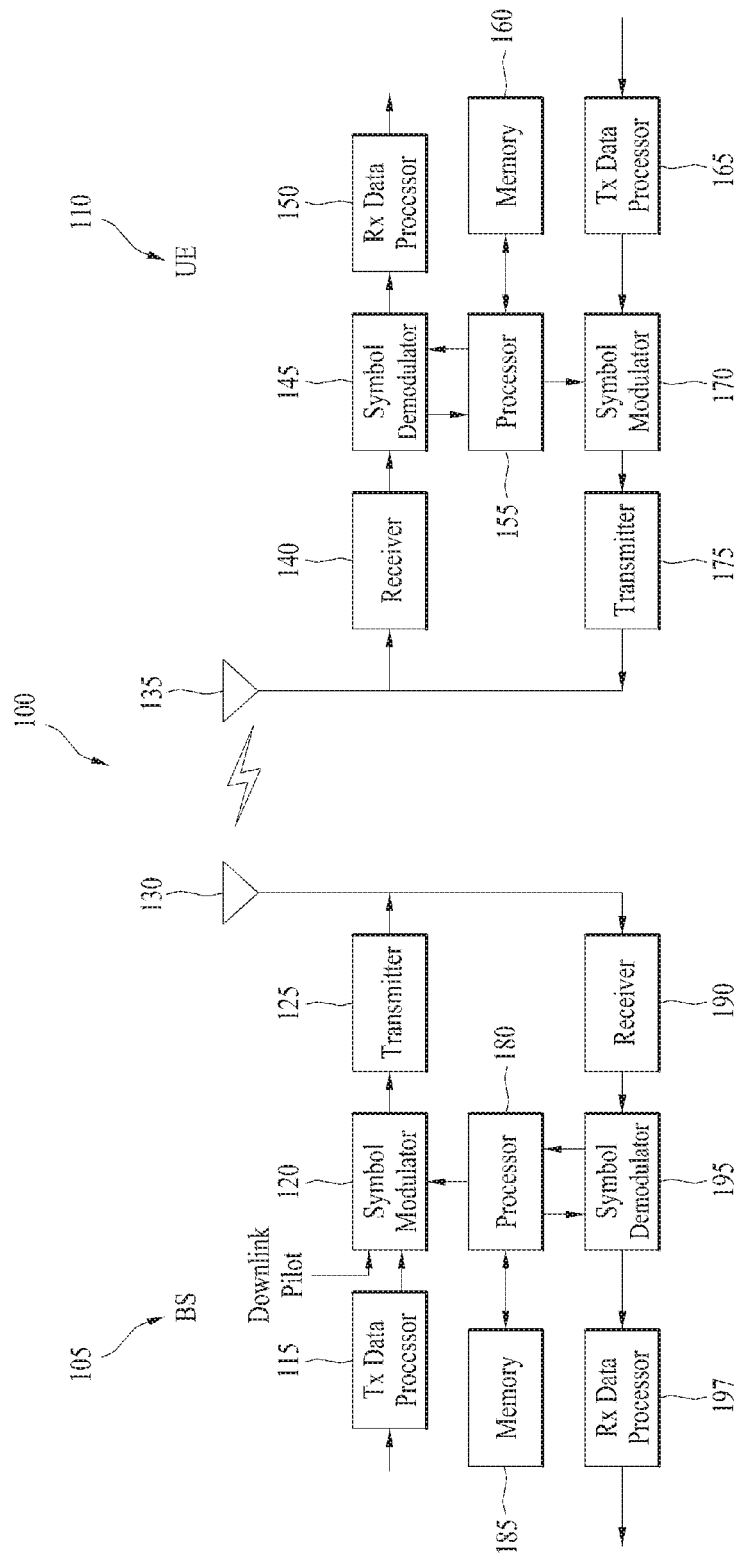
FIG. 18 is a diagram illustrating a user equipment and a base station according to one embodiment of the present invention.

FIG. 18 is a block diagram illustrating a base station (BS) 105 and a user equipment (UE) 110 for use in a wireless communication system 100 according to the present invention. The BS and the UE of FIG. 18 may perform the operations of aforementioned embodiments.

Referring to FIG. 18, the BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 receives and processes the stream of symbols to generate an uplink (UL) signal, and the UL signal is transmitted to the BS 105 through the antenna 135.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

In the present specification, the processor 155 of the UE and the processor 180 of the base station perform operations of processing signals and data except functions for the UE 110 and the base station 105 to receive, transmit and store signals, respectively. Yet, for clarity, the processors 155 and 180 are not mentioned especially. Although the processors 155 and 180 are not mentioned especially, they can be regarded as performing a series of operations (e.g., data processing, etc.) other than the signal receiving, transmitting, and storing functions.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention mentioned in the foregoing description are applicable to various kinds of mobile communication systems.

What is claimed is:

1. A method of transmitting a signal by a user equipment (UE) in a wireless communication system supporting vehicle to everything (V2X), the method comprising:
   measuring a pathloss for a fixed node; and
   transmitting a V2X signal based on a V2X transmission periodicity or an event trigger,
   wherein when transmission of the V2X signal is performed in an open loop power control (OLPC) resource region that is configured periodically, transmit power of the V2X signal is determined based on the measured pathloss and
   wherein a periodicity of the OLPC resource region is configured independently of the V2X transmission periodicity.

2. The method of claim 1, wherein the periodicity of the OLPC resource region is configured as a value relative prime with the V2X transmission periodicity.

3. The method of claim 1, wherein when the transmission of the V2X signal is performed based on the event trigger, the UE is configured to transmit the V2X signal at least one time in the OLPC resource region.

4. The method of claim 1, wherein the periodically configured OLPC resource region comprises a first region where the fixed node overhears the V2X signal.

5. The method of claim 4,
   wherein the periodically configured OLPC resource region comprises a second region where the fixed node performs transmission and
   wherein the fixed node transmits the overheard V2X signal to a different fixed node in the second region.

6. The method of claim 1, wherein when the transmission of the V2X signal is performed in a different resource region, the transmit power of the V2X signal is fixed to a prescribed value irrespective of the measured pathloss.

7. The method of claim 1, wherein the fixed node corresponds to a fixed node having highest reception power among fixed nodes adjacent to the UE.

8. A method of receiving a signal by a fixed node in a wireless communication system supporting vehicle to everything (V2X), the method comprising:
   transmitting a reference signal for measuring a pathloss to a user equipment (UE); and receiving, through an open loop power control (OLPC) resource region that is configured periodically, a V2X signal transmitted based on a V2X transmission periodicity or an event trigger, wherein transmit power of the V2X signal is determined based on the measurement of the pathloss and wherein a periodicity of the OLPC resource region is configured independently of the V2X transmission periodicity.

9. The method of claim 8, wherein the periodicity of the OLPC resource region is configured as a value relative prime with the V2X transmission periodicity.

10. The method of claim 1,
wherein the periodically configured OLPC resource region comprises a first region where the fixed node overhears the V2X signal and a second region where the fixed node performs transmission and
wherein the fixed node transmits the overheard V2X signal to a different fixed node in the second region.

11. A user equipment in a wireless communication system supporting vehicle to everything (V2X), comprising:
a processor to measure a pathloss for a fixed node; and
a transmitter to transmit a V2X signal based on a V2X transmission periodicity or an event trigger,
wherein when transmission of the V2X signal is performed in an open loop power control (OLPC) resource region that is configured periodically, transmit power of the V2X signal is determined based on the measured pathloss and
wherein a periodicity of the OLPC resource region is configured independently of the V2X transmission periodicity.

12. The user equipment of claim 11, wherein the periodicity of the OLPC resource region is configured as a value relative prime with the V2X transmission periodicity.

13. The user equipment of claim 11, wherein when the transmission of the V2X signal is performed based on the event trigger, the user equipment is configured to transmit the V2X signal at least one time in the OLPC resource region.

14. The user equipment of claim 11, wherein the periodically configured OLPC resource region comprises a first region where the fixed node overhears the V2X signal.

15. The user equipment of claim 14,
wherein the periodically configured OLPC resource region comprises a second region where the fixed node performs transmission and
wherein the fixed node transmits the overheard V2X signal to a different fixed node in the second region.

* * * * *